United States Patent
Sato et al.

[11] Patent Number: 6,118,944
[45] Date of Patent: Sep. 12, 2000

[54] FLASHLIGHT CONTROL APPARATUS

[75] Inventors: Osamu Sato; Nobuhiko Matsudo, both of Tokyo, Japan

[73] Assignee: Asahi Kogaku Kogyo Kabushiki Kaisha, Tokyo, Japan

[21] Appl. No.: 09/122,378

[22] Filed: Jul. 27, 1998

Related U.S. Application Data

[62] Division of application No. 08/950,190, Oct. 14, 1997, Pat. No. 5,822,628, which is a division of application No. 08/580,530, Dec. 28, 1995, Pat. No. 5,729,772.

[30] Foreign Application Priority Data

| Dec. 28, 1994 | [JP] | Japan | 6-328783 |
| Dec. 28, 1994 | [JP] | Japan | 6-328784 |
| Feb. 10, 1995 | [JP] | Japan | 7-022960 |

[51] Int. Cl.[7] .................................... G03B 15/05
[52] U.S. Cl. ....................... 396/61; 396/161; 396/182
[58] Field of Search ...................... 396/61, 159–163, 396/182

[56] References Cited

U.S. PATENT DOCUMENTS

| 4,441,797 | 4/1984 | Maruyama et al. | 396/159 |
| 4,887,120 | 12/1989 | Kobayashi et al. | 396/160 |
| 5,111,231 | 5/1992 | Tokunaga | 396/123 |
| 5,138,361 | 8/1992 | Iwamoto et al. | 396/159 |
| 5,257,063 | 10/1993 | Ishimaru et al. | 396/106 |
| 5,283,610 | 2/1994 | Sasaki | 396/57 |
| 5,325,147 | 6/1994 | Kirigaya et al. | 396/67 |
| 5,557,366 | 9/1996 | Hirai et al. | 396/159 |
| 5,602,614 | 2/1997 | Ohtsuka et al. | 396/61 |
| 5,682,562 | 10/1997 | Mizukoshi et al. | 396/159 |
| 5,729,772 | 3/1998 | Sato et al. | 396/159 |

FOREIGN PATENT DOCUMENTS

| 1246655 | 9/1971 | United Kingdom . |
| 2121973 | 1/1984 | United Kingdom . |

*Primary Examiner*—W. B. Perkey
*Attorney, Agent, or Firm*—Greenblum & Bernstein, P.L.C.

[57] ABSTRACT

A flashlight control apparatus having a device for emitting flashlight towards a subject and a device for receiving the light reflected from the subject through a photographing lens. An output is generated which corresponds to the received light which is time-integrated in order to calculate the amount of light received. An optimum integration level is calculated which is to be integrated. This optimum integration level corresponds to an optimum quantity of flashlight to be emitted by the emitting means, based on film speed information. A time limit is also calculated, which is shorter, by a predetermined length of time, than an optimum emission time of the emitting device. This optimum emission time is based on aperture value information and object distance information. The emitting device is controlled to stop emitting flashlight when the time limit elapses, in the case where a quantity of light received by the light receiving devices has reached an optimum quantity before the time limit elapses.

9 Claims, 29 Drawing Sheets

FIG. 8

TABLE (ISO100 GNo14)

| GNo | μS |
|-----|-----|
| 0.5 | 7 |
| 1.0 | 12 |
| 1.5 | 17 |
| 2.0 | 25 |
| 2.5 | 32 |
| 3.0 | 45 |
| 3.5 | 57 |
| 4.0 | 70 |
| 4.5 | 85 |
| 5.0 | 100 |
| 5.5 | 120 |
| 6.0 | 140 |
| 6.5 | 167 |
| 7.0 | 200 |
| 7.5 | 230 |
| . | . |
| . | . |

ISO - TTL_DA LEVEL TABLE

| SV | ISO | TTL_DA LEVEL (mv) |
|---|---|---|
| 3 | 25 | 2000 |
| 3.5 | - | 1414 |
| 4 | 50 | 1000 |
| 4.5 | - | 707 |
| 5 | 100 | 500 |
| 5.5 | - | 354 |
| 6 | 200 | 250 |
| : | : | : |

FIG. 27 (A)

·GNo = 14

| GN | TIME (μs) |
|---|---|
| 1 | 12 |
| 2 | 25 |
| 3 | 45 |
| 4 | 70 |
| 5 | 100 |
| 6 | 140 |
| 7 | 200 |
| ⋮ | ⋮ |

FIG. 27 (B)

·GNo = 20

| GN | TIME (μs) |
|---|---|
| 1 | 20 |
| 2 | 25 |
| 3 | 40 |
| 4 | 60 |
| 5 | 80 |
| 6 | 100 |
| 7 | 160 |
| ⋮ | ⋮ |

FIG. 27 (C)

·GNo = 24

| GN | TIME (μs) |
|---|---|
| 1 | 10 |
| 2 | 17 |
| 3 | 27 |
| 4 | 40 |
| 5 | 60 |
| 6 | 80 |
| 7 | 100 |
| ⋮ | ⋮ |

$t = e^{A \cdot GN} - 1$ $t = B \cdot GN^2$

FIG. 32 (A)

· W = 13 (JOULE)

| GN | t (μs) |
|---|---|
| 1 | 12 |
| 2 | 25 |
| 3 | 45 |
| 4 | 70 |
| 5 | 100 |
| 6 | 140 |
| 7 | 200 |
| ⋮ | ⋮ |

FIG. 32 (B)

· W = 30 (JOULE)

| GN | t (μs) |
|---|---|
| 1 | 10 |
| 2 | 17 |
| 3 | 27 |
| 4 | 40 |
| 5 | 60 |
| 6 | 80 |
| 7 | 100 |
| ⋮ | ⋮ |

FLASHLIGHT CONTROL APPARATUS

This is a divisional of application Ser. No. 08/950,190, filed Oct. 14, 1997, now U.S. Pat. No. 5,822,628, which is a divisional application under 37 C.F.R. 1.60 of U.S. patent application Ser. No. 08/580,530, filed Dec. 28, 1995, now U.S. Pat. No. 5,729,772, both of which are incorporated by reference herein in their entireties.

BACKGROUND OF THE INVENTION

1. Field of the Invention

The present invention relates to a flashlight control device for controlling a light emission device such as a strobe.

2. Description of Related Art

Photographic cameras of so-called TTL (through-the-lens) photometric type (referred to hereinafter as "TTL light control cameras") are well known. In strobe photographing with this type of camera, a strobe light is reflected from a subject to be photographed to enter the photographing lens and is measured by a photometric sensor to achieve a light control of the strobe (i.e., control of flash termination). When the quantity of reflected light reaches an optimum level (TTL–Digital-Analog (DA) level) the flash is cut off, depending on a particular film speed, so as to obtain an optimum exposure.

However, in TTL light control cameras of the prior art, it has sometimes been impossible to achieve an optimum exposure for a scene composed of objects having significantly different reflectivities. For example, if the scene to be photographed contains an object having a reflectivity significantly higher than those of other objects in the same scene, the light control is sometimes based on only that portion of the strobe light that is reflected on this object and thus duration of strobe flashing becomes shorter, i.e., the picture will be under-exposed as a whole. On the other hand, if the light control is based on an object having a significantly lower reflectivity, the duration of strobe flashing increases, i.e., the picture will be over-exposed as a whole.

Some TTL light control cameras are provided with a so-called multi-photometric sensor, in which several areas of a scene to be photographed are measured by respective photometric sensors during so-called pre-flashing of the strobe. The sensor to be used is selected, depending on the measured reflectivity, before proper strobe flashing. The selected sensor is used for the light control (TTL–Auto Strobe Level control).

With this type of TTL light control camera, consideration can be given to the reflectivity of the scene to be photographed, however various factors, such as, the presence and influence of a filter attached to the photographing lens, can not be detected. In consequence, an optimum quantity of flash can not be obtained when the quantity of light transmitted through the photographing lens is reduced by the presence of the filter and the resulting picture is often under-exposed.

Some well known cameras having so-called multi-rangefinding (multi-AF) and multi-photometry functions, employ a flashlight control apparatus such that the photometric sensor, correspondingly associated with the AF sensor selected by multi-rangefinding is utilized for the light control. However, as in the case of the TTL light control camera mentioned above, it is sometimes impossible to obtain the optimum quantity of flash if the scene to be photographed is composed of objects having significantly different reflectivities.

SUMMARY OF THE INVENTION

It is an object of the invention to provide a flashlight control device adapted to control strobe flashing so as to obtain the optimum quantity of light even when a filter is attached to the photographing lens, or a scene to be photographed is composed of objects having significantly different reflectivities, or even when the strobe is operated in a bounced state.

It is another object of the invention to provide a multi-lamp flash control apparatus allowing the optimum exposure to be achieved even when a portion of the scene to be photographed is of an extremely high or low reflectivity.

To achieve the object mentioned above, according to an aspect of the present invention, a flashlight control apparatus is provided, which comprises a strobe for emitting flashlight towards a subject; a light receiver for receiving that light is reflected from the subject through a photographing lens and for generating an output corresponding to the light received; a device for time-integrating (time quadrature) the output to calculate the amount of received light; respective devices for inputting aperture value information, object distance information and film speed information; a drive for calculating an optimum integration level to be integrated. The optimum integration level corresponds to an optimum quantity of flashlight to be emitted by the strobe, based on the film speed information; and a time limit which is shorter, by a predetermined length of time, than an optimum emission time of the strobe, wherein the optimum emission time is based on the aperture value information and the object distance information; and, a controller for controlling the strobe to stop emitting the flashlight when the time limit elapses, in the case where a quantity of light received by the light receiver has reached an optimum quantity before said time limit elapses.

In one embodiment of the present invention, the light receiver comprises a plurality of light receiving portions for receiving subject light from different areas, wherein the time-integrating device comprises a plurality of time-integrating elements for time-integrating respective outputs generated by the plurality of light receiving elements so as to calculate the quantity of the received light; and further wherein the controller controls the strobe to stop emitting flashlight at the time the time limit elapses, in the case where all resulting integration levels of the respective outputs, time-integrated by the respective plurality of time-integrating elements, have each reached the optimum integration level before the time limit elapses, and further controls the strobe to stop emitting flashlight at the time a resulting integration level of one of the respective outputs time-integrated by the respective plurality of time-integrating elements reaches the optimum integration level after the time limit has elapsed, in the case where the all resulting integration values have not reached the optimum integration level when the time limit elapses.

In this case, one of the plurality of time-integrating elements which calculates the one resulting integration level is one of the plurality of time-integrating elements whose resulting integral level reaches the optimum integration level before any other of the plurality of time-integrating elements, after the time limit has elapsed.

In another aspect of the present invention, the calculating device calculates the time limit by calculating a guide number according to the object distance information and an operational aperture value determined by the aperture value information to which a predetermined correction is applies. The calculated guide number is then converted into an emission time through a data table.

In this case, the data table includes a plurality of reference guide numbers and a plurality of emission times corresponding to the reference guide numbers.

To achieve the object mentioned above, according to an another aspect of the present invention, a flashlight control apparatus is provided, which comprises a strobe for emitting flashlight towards a subject; light receiver for receiving light reflected from the subject through a photographing lens; respective devices for inputting aperture value information, object distance information and film speed information; a calculator for calculating an optimum quantity of light received by the light receiver, wherein the optimum quantity of light corresponds to an optimum quantity of flashlight emitted by the strobe and based on the film speed information; a first time limit which is shorter, by a predetermined length of time, than an optimum emission time of the strobe, wherein the optimum emission time is based on the aperture value information and the object distance information; and a second time limit which is longer, by a predetermined length of time, than the optimum emission time of the strobe; and a controller for controlling the strobe to stop emitting flashlight when the first time limit elapses, in the case where a quantity of light received by the light receivers has reached the optimum quantity of light before the first time limit elapses, and further controlling the strobe to stop emitting flashlight when a quantity of light received by the light receiver has reached the optimum quantity of light before the second time limit elapses or when the second time limit has elapsed before the quantity of light received by the light receiver reaches the optimum quantity of light, in the case where the quantity of light received by the light receiver has not reached the optimum quantity of light when the first time limit elapses.

In another aspect of the present invention, a flashlight control apparatus is provided, comprising a strobe for emitting flashlight towards a subject; a receiver for receiving light reflected on the subject through a photographing lens; respective devices for inputting aperture value information, object distance information and film speed information; a calculator for calculating an optimum quantity of light received by the light receiver, wherein the optimum quantity of light corresponds to an optimum quantity of flashlight emitted by the strobe and based on the film speed information; and, a time limit which is longer, by a predetermined length of time, than an optimum emission time of the strobe, wherein the optimum emission time is based on the aperture value information and the object distance information; and a controller for controlling the emitting means to stop emitting flashlight when a quantity of light received by the light receiver has reached the optimum quantity of light before the time limit elapses or when the time limit has elapsed before the quantity of light received by the light receiver reaches the optimum quantity of light, in the case where the quantity of light received by the light receiver has reached the optimum quantity of light.

In another aspect of the present invention, the light receiver comprises a plurality of light receiving elements for receiving subject light from different areas, and wherein the controls the strobe to stop emitting flashlight when the first time limit elapses, in the case where all quantities of light received by the respective plurality of light receiving portions have each reached the optimum quantity of light before the first time limit elapses, and further controls the strobe to stop emitting flashlight when a quantity of light received by one of the plurality of light receiving elements has reached the optimum quantity of light before the second time limit elapses or when the second time limit has elapsed, before a quantity of light received by one of the plurality of light receiving elements reaches the optimum quantity of light, in the case where the quantity of light received by at least one of the light receiving means has not reached the optimum quantity of light when the first time limit elapses.

In this case, one of the plurality of light receiving elements is one of the plurality of light receiving elements which receives the optimum quantity of light before any of the other plurality of light receiving elements after the first time limit has elapsed.

Preferably, the flashlight control apparatus further comprises respective devices for detecting whether a flash-bounce mode is selected, or whether a filter has been. attached to a photographing lens. When it is detected that the flash-bounce mode has been selected or that the filter has been attached, the controller controls the strobe to stop emitting flashlight when the quantity of light received by the light receiver reaches the optimum quantity of light, in the case where the light receiver has not received the optimum quantity of light when the first time limit elapses.

The calculating device calculates each of the first and second time limits by calculating a guide number according to the object distance information and an operational aperture value determined by the aperture value information to which a predetermined correction is applied, and converts the calculated guide number into an emission time through a data table which shows a relation between guide numbers and emission times of the strobe.

Preferably, the flashlight control apparatus further comprises a device for time-integrating the output to calculate a quantity of the received light. The calculating device calculates an optimum quantity of light received by the light receiver, wherein the optimum quantity of light corresponds to an optimum quantity of flashlight emitted by the strobe, based on the film speed information; a first time limit time which is shorter, by a predetermined length of time, than an optimum emission time of the strobe, wherein the optimum emission time is based on the aperture value information and the object distance information; and a second time limit which is longer, by a predetermined length of time, than the optimum emission time of the strobe.

According to another aspect of the present invention, there is provided a flashlight control apparatus for controlling a plurality of strobes to each emit flashlight towards a subject at the same time. The flashlight control apparatus comprises a receiver for receiving light reflected from a subject and for generating an output corresponding to the received light; respective devices for inputting object distance information, film speed information and guide number information from each of the plurality of strobes; an exposure calculation device for calculating a subject brightness according to the output generated by the light receiver and for calculating an aperture value according to the subject brightness and the film speed information; an integrating device which includes a plurality of light receiving elements and integrates an output generated by each of the plurality of light receiving elements; and a flashlight quantity setting device for setting an optimum quantity of flashlight emitted by the plurality of strobes as an optimum integration level of the light receiver. As including is a flashlight emitting time calculation device for calculating optimum guide number information according to the object distance information and the aperture value calculated by the exposure calculation means; a composite guide number information according to the guide number information; and an emitting time during which each of the plurality of strobes continue to emit flashlight according to the optimum guide number information and the composite guide number information; and a flashlight emission controlling device for controlling all of the plurality of strobes to stop emitting flashlight, in the case where all integrated outputs generated by the plurality of light receiving elements and integrated by the integrating device have each reached the optimum integration level before the emitting time elapses.

Preferably, the flashlight emission controlling device controls all of the plurality of strobes to stop emitting flashlight when one of the integrated outputs has reached the optimum integration level before the emitting time elapses, in the case where none of the integrated outputs has reached the optimum integral value when the emitting time elapses.

In one embodiment of the present invention, the integrating means comprises a plurality of integrating device each corresponding to the plurality of light receiving elements.

It is preferred that the device further comprises a plurality of comparators corresponding to the plurality of integrating device for each comparing corresponding one of the integrated outputs with the optimum integration level so as to detect either a condition that the corresponding one reaches the optimum integration level or a condition that the corresponding one exceeds said optimum integration level.

In one embodiment of the invention, the flashlight emitting time calculation device calculates a composite quantity of flashlight of the plurality of strobes according to the following:

$$t = e^{AGN} - 1$$

wherein "t" represents an emission time of the plurality of strobes;

"e" represents a base of natural logarithm;

"$_{GN}$" represents the optimum guide number; and

"$_A$" represents a fixed number determined in accordance with a composite guide number GN0 of the plurality of strobes.

In another embodiment, the flashlight emitting time calculation means calculates a composite quantity of flashlight of the plurality of strobes according to the following equation:

$$t = B \times GN^2$$

wherein "t" represents an emission time of the plurality of strobes;

"B" represents the fixed number determined in accordance with a composite guide number GN0 of the plurality of strobes; and "GN" represents the optimum guide number.

In yet another embodiment, the invention further comprises a plurality of capacitors for the plurality of strobes, and the flashlight emitting time calculation device calculates a composite quantity of light of the plurality of strobes, in accordance with a total capacity of the plurality of capacitors and a total voltage of the plurality of capacitors.

In this case, the flashlight emission controller outputs an emission control signal to actuate each of the plurality of strobes to start emitting flashlight. The flashlight emission controller further outputs a compulsion quench signal for controlling all of the plurality of strobes to compulsively stop emitting flashlight at the time a predetermined time elapses, after the emission time has elapsed.

The light receiver generates an output corresponding to the received light and the flashlight control apparatus further comprises a device for time-integrating the output to calculate the quantity of light.

The flashlight control apparatus further comprises a plurality of time-integrating elements for time-integrating respective outputs generated by the respective plurality of light receiving elements so as to calculate all of the quantities of light.

The present disclosure relates to subject matter contained in Japanese Patent Application Nos. 06-328783, 06-328784 (both filed on Dec., 28, 1994) and 07-22960 (filed on Feb. 10, 1995) which are expressly incorporated herein by reference in their entireties.

BRIEF DESCRIPTION OF THE DRAWINGS

The invention will be described below in detail with reference to the accompanying drawings, in which:

FIG. 8 is a conversion table showing a relationship between the duration of a strobe light emission and a guide number, in the first embodiment;

FIGS. 27A, 27B and 27C form is a table showing a relationship between a guide number and the duration of light emission for the first embodiment shown in FIG. 25;

FIGS. 32A and 32B form a table showing a relationship between a guide number and the duration of light emission for the third embodiment shown in FIG. 30; and, FIG. 33 is a flow chart illustrating a fourth embodiment of a strobe information—time data conversion, in the single lens reflex camera shown in FIG. 18.

DESCRIPTION OF THE PREFERRED EMBODIMENTS

Details of the invention will be better understood from the following description of embodiments, made in reference to the accompanying drawings.

Figure 1:
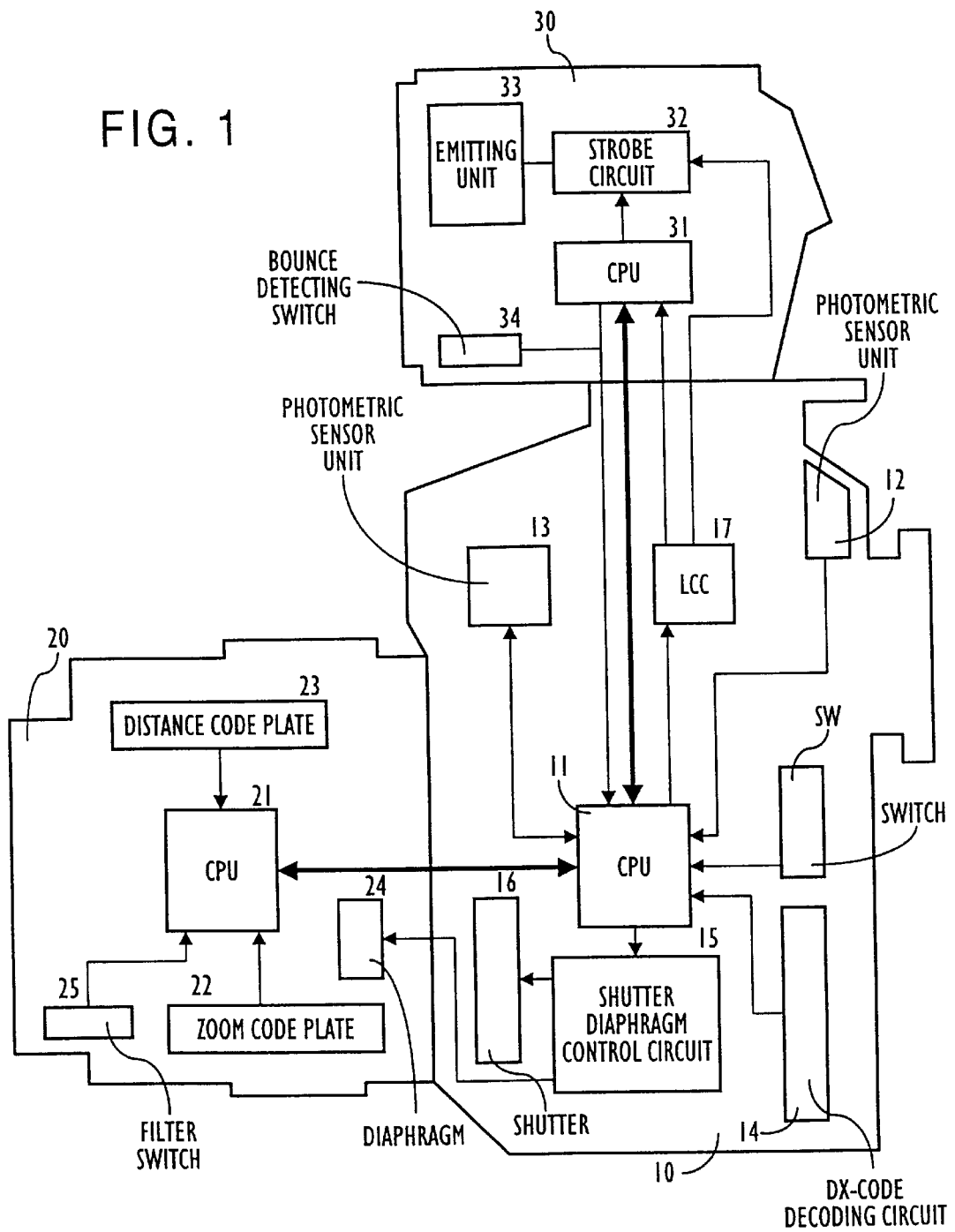
FIG. 1 is a block diagram illustrating some of the components of a control system used in a first and second embodiments of a single lens reflex camera having a flashlight control apparatus, according to the first aspect of the present invention.

FIG. 1 is a block diagram illustrating some of the components of a control system in a single lens reflex camera having a flashlight control apparatus, according to a first aspect of the present invention. A camera body 10 is provided with an interchangeable zoom lens 20 and an external strobe 30. The camera body 10, the zoom lens 20 and the external strobe 30 are provided with a main CPU 11, a lens CPU 21 and a strobe CPU 31, respectively. The main CPU 11 receives and transmits data from and to the lens CPU 21 and the strobe CPU 31 through respective ports (not shown) connected through electrical contacts (not shown).

Although not shown in detail, the camera body 10 is additionally provided with, a main switch designated, by the reference symbol SW. The main switch serves several functions, such as, a switch for turning a power source ON/OFF, and a switch to select various camera functions, for example, to select an exposure mode, a photometric switch, a release switch etc. Corresponding to the ON/OFF states of these switches the main CPU 11 executes processing.

The camera body 10 is still further provided with photometric sensor units 12, 13, adapted to receive incident light coming from a scene to be photographed through the zoom lens 20, as well as a DX-code decoding circuit 14, which serves as a film speed inputting means for reading a DX-code printed on a film. Output signals from each of these (12, 13, 14) are input to the main CPU 11.

The camera body 10 contains a shutter/diaphragm controlling circuit 15, which serves as an exposure controlling system, and a light control circuit 17 which serves as a strobe controlling system. The main CPU 11 controls a shutter 16 and a diaphragm 24 of the zoom lens 20 through the shutter/diaphragm controlling circuit 15 and controls the light emission of the external strobe 30 through the strobe CPU 31.

The zoom lens 20 is provided with a zoom code plate 22 which detects a current focal length, and a distance code plate 23 which detects an object distance at which an object to be photographed will be in focus. Data from these code plates 22, 23 may be input to the lens CPU 21. Although not illustrated in detail, it should be understood that the focusing lens is driven by an AF motor and the lens driving mechanism contained within the camera body 10.

The zoom lens 20 is further provided towards its front end with a filter switch 25 which detects whether or not a filter has been attached to the zoom lens 20.

The lens CPU 21 includes a ROM (not shown) which has information stored regarding the zoom lens 20, such as, the maximum aperture value Av (i.e., maximum f-number) and the minimum aperture value Av (i.e., minimum f-number).

The strobe 30 is provided with a strobe circuit 32 and an emitting unit 33. The strobe circuit 32 includes a capacitor (condenser), a battery, etc. (all not shown). The emitting unit 33 includes a xenon tube, a reflector, a Fresnel lens, a mechanism for "bouncing" flash (not shown), and a bounce detecting switch 34 which detects whether or not the strobe 30 is being used for "bouncing".

Figure 3:
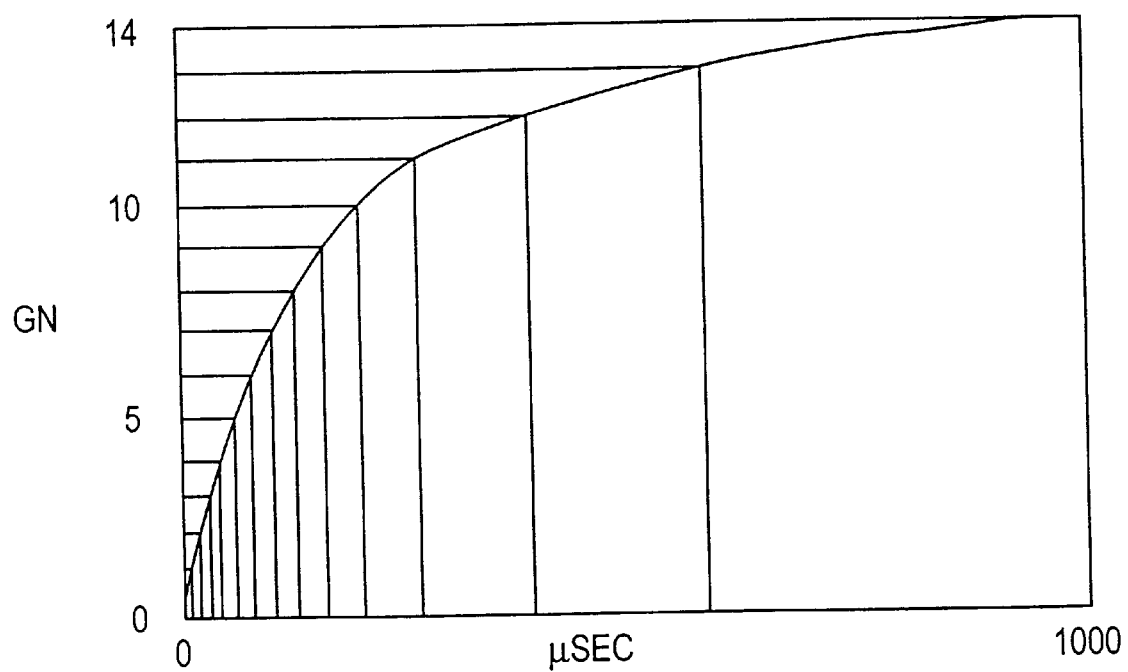
FIG. 3 is graph showing a relationship between the duration of of strobe light emission and a quantity of light (guide number) emitted from the strobe.

The strobe CPU 31 includes a ROM (not shown) which has stored various data necessary for adjusting the illumination of the strobe 30, such as, guide number data, illuminating angle data and illumination characteristic data. During photographing, these data are transmitted to the main CPU 11. The illumination characteristic data refers to a relationship between the emission time and the amount of light emitted from the strobe 30, when in a fully charged state, as shown in FIG. 3. According to this first embodiment, such data is stored in the form of a table, as shown in FIG. 8. In the case of full light emission, a guide number of 14 is used.

Figure 2:
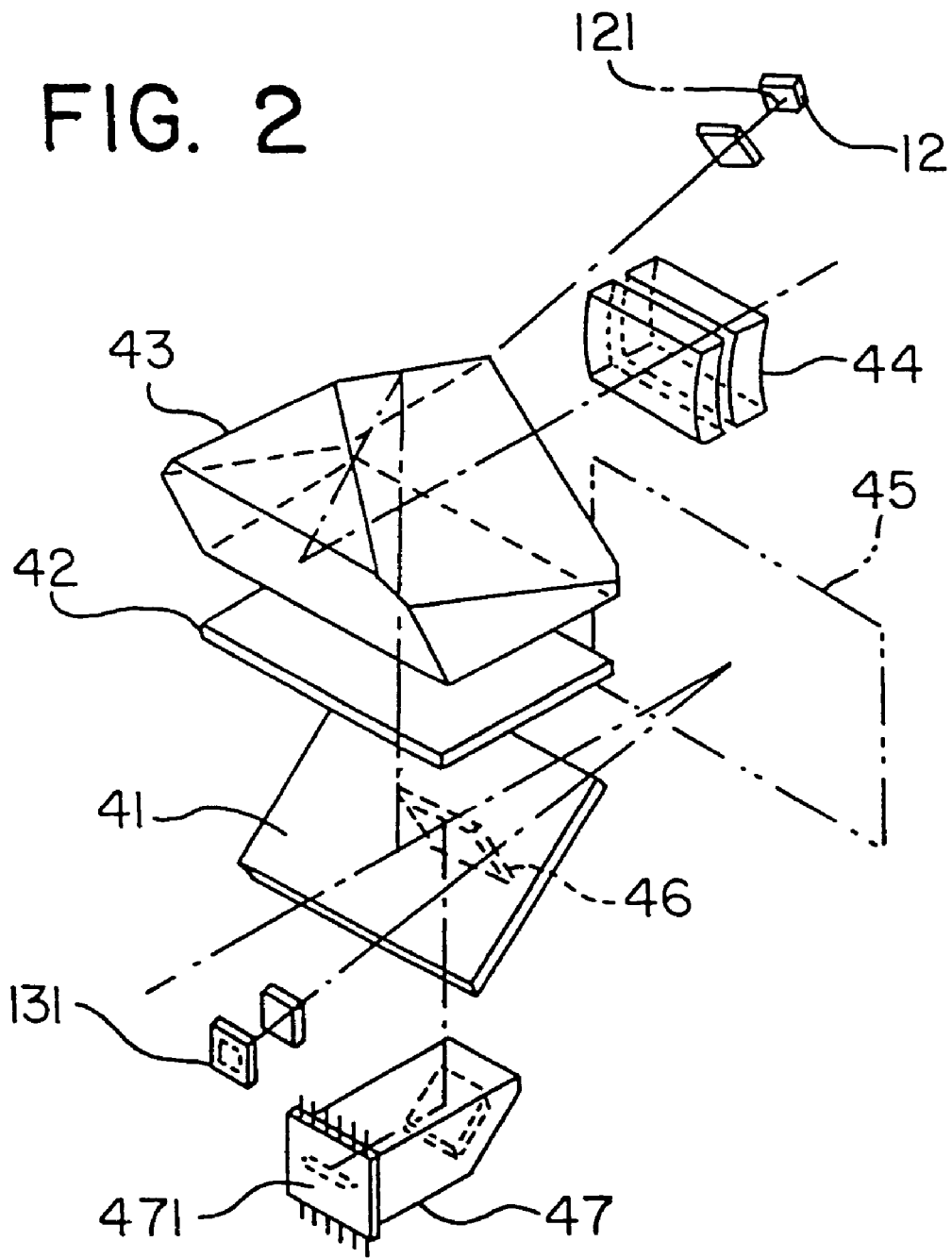
FIG. 2 is a diagram showing an optical path for the viewfinder, photometric and AF-optical systems of the single lens reflex camera shown in FIG. 1.

FIG. 2 illustrates a photometric optical system and a rangefinding optical system arranged in the camera body 10.

A light beam from a scene to be photographed, enters the zoom lens (not shown in FIG. 2) and after being reflected by a main mirror 41, forms an image of the scene on a focusing screen 42. A photographer views this image, as an erected real image, through a pentaprism 43 and an eyepiece 44. A portion of the light beam transmitted through the focusing screen 42 enters a light receiving element 121 of the photometric sensor unit 12, placed in the proximity of the eyepiece 44. The photometric sensor unit 12 is used to measure luminance of the scene to be photographed before exposure, i.e., when the main mirror 41 is in an inclined position (as shown in FIG. 2). When exposure commences, i.e., upon flashing of the strobe 30, the strobe flashlight reflected on the scene to be photographed is received by the (TTL direct) photometric sensor unit 12. This will be described later in more detail.

A portion of the light beam transmitted through a central half-mirror section of the main mirror 41 is reflected by a sub-mirror 46 towards an AF unit 47. AF units of this type are well known and comprise a beam-splitting optical system adapted to split the light beam, coming from the scene to be photographed, into two or more beams for image formation, and a CCD sensor adapted to receive the light beam thus split. Though not shown, the camera body 10 is provided with AF apparatus, adapted to drive the focusing lens of the zoom lens 20, based upon a defocused amount detected by the AF unit 47.

During exposure, the main mirror 41 swings upward thus allowing a light beam, coming from the scene to be photographed, to be made incident upon a film or a shutter curtain 45, before the light beam is incident upon a photodiode 131 (light receiving element) of the TTL direct photometric sensor unit 12.

According to this first embodiment, for strobe photographing, after AF processing, the main CPU 11 calculates the optimum guide number based on object distance data input by the distance code plate 23 and aperture value data, to obtain a first guide number which is smaller than the optimum guide number by a given value, and a second guide number which is larger than the optimum guide number by a given value. The main CPU 11 then obtains the duration of strobe flashing corresponding to these guide numbers from the data conversion table shown in FIG. 3.

Figure 4:
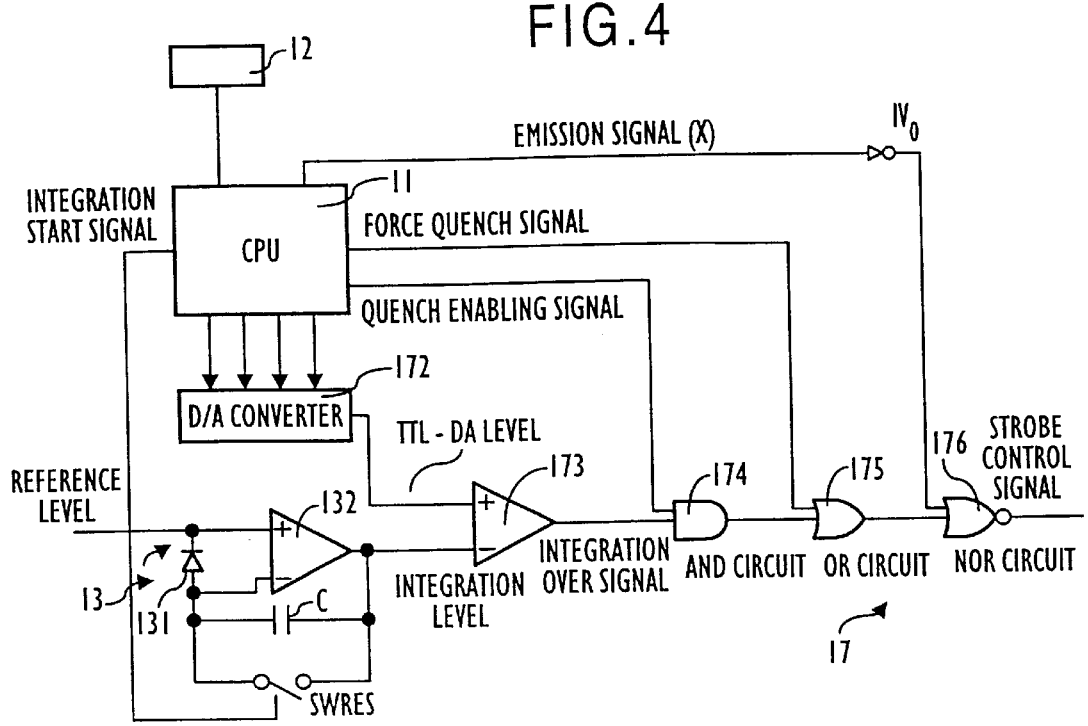
FIG. 4 is a block diagram illustrating a light control circuit of the single lens reflex camera shown in FIG. 1.
Figure 5:
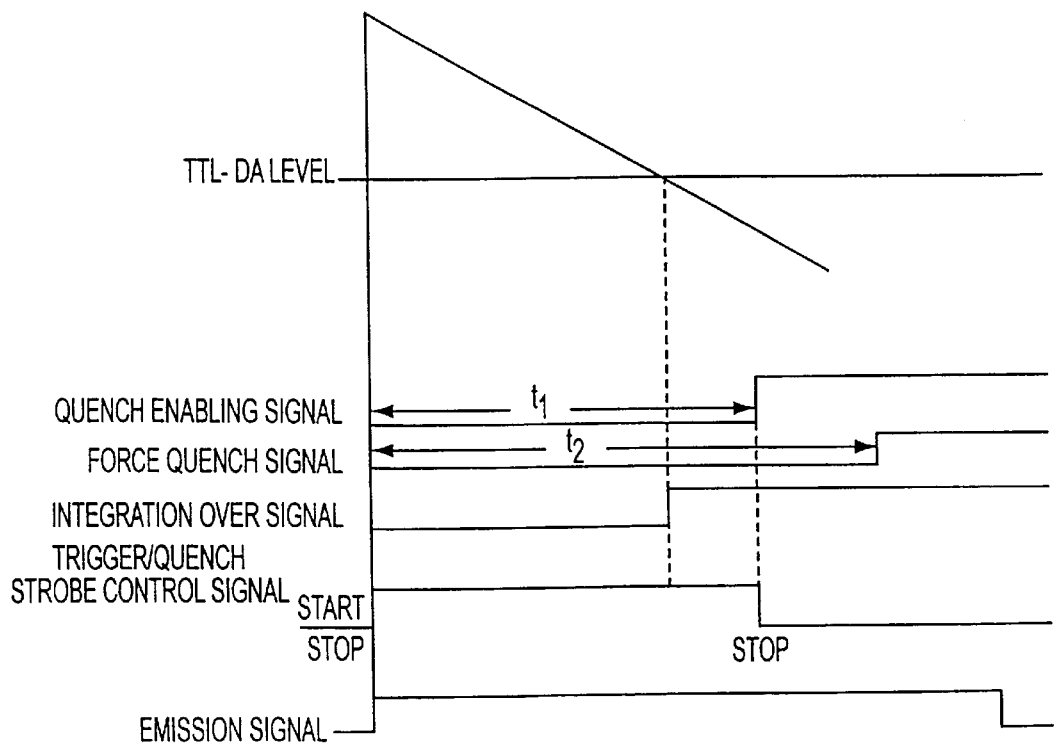
FIG. 5 is a timing chart illustrating a sequential operation of the light control circuit shown in FIG. 4.

FIG. 4 is a detailed circuit diagram illustrating the light control circuit 17 in cooperation with the main CPU 11, to control light emission (flashing) from the strobe 30. FIG. 5 is a timing chart illustrating a sequential operation of the light control circuit 17.

The photodiode 131 of the direct photometric sensor unit 13 is connected between inverted and non-inverted input terminals of an integrating circuit 132, to detect a quantity of light received. The integrating circuit 132 comprises an operational amplifier, an integrating capacitor C connected between an output terminal, an inverted input terminal of the operational amplifier and a normally closed reset switch SWRES adapted to reset (discharge) said integrating capacitor C. In response to an integration start signal outputted from the main CPU 11, the reset switch SWRES is opened and consequently the integrating circuit 132 begins to integrate the output of the photodiode 131. Integration levels (voltages) provided from the integrating circuit 132 pass to an inverted input terminal of a comparator 173.

In the embodiments, the terms "integration level" and "integration value" refer to the outputs of the integrating circuit 132 (and integrating circuits 521–525). So that, when the quantity of light received by the photodiode 131 (photodiodes 511–515) increases, the integration value (integration level) decreases (FIG. 5).

The main CPU 11 calculates the optimum duration of light emission from the external strobe 30 on the basis of various information, such as, object distance data input from the distance code plate 23, ISO speed data input by the DX-code decoding circuit 14, aperture value data input from the lens CPU 21 during photometric processing and illumination characteristic data input from the strobe CPU 31. Additionally, the main CPU 11 calculates the optimum integration value (level) based on the film speed.

The optimum integration value is converted by a D/A converter 172 into a corresponding analog signal (the optimum TTL–DA level (voltage)) and input to a non-inverted input terminal of a comparator 173.

The comparator 173 compares the integration level output from the integrating circuit 132 with the TTL–DA level output from the main CPU 11 and outputs a signal "H" (high level signal) representing completed integration.

The output of the comparator 173 passes to one input of an AND circuit 174. To another input of the AND circuit 174, a quench permission (enabling) signal is applied from the main CPU 11. Thus, the output of the AND circuit 174 is inverted into an "H" level signal, representing completed integration.

The output of the AND circuit 174 passes to one input of an OR circuit 175. To another input of the OR circuit 175, a compulsion (force) quench signal is applied from the main CPU 11. Thus, the output of the OR circuit 175 is inverted into an "H" level signal, representing completed integration.

The output of the OR circuit 175 passes to one input of a NOR circuit 176. To another input of the NOR circuit 176, a light emission signal is applied from the main CPU 11 via an inverter $IV_0$. Thus, the output, i.e., the strobe control signal from the NOR circuit 176 will be a trigger signal of "H" level when the output of the NOR circuit 176 is of an "L" (low) level signal and the light emission signal is of an "H" level signal. Otherwise the strobe control signal will be a quench signal of an "L" level.

In response to the strobe control signal output from the NOR circuit 176, the strobe circuit 32 will be triggered to flash if the strobe control signal is of an "H" level and will terminate flashing if the strobe control signal is of an "L" level.

The light control circuit 17 as has been described hereinabove operates during light emission from the strobe, substantially, as follows:

Start Light Emission

In response to the strobe light emission signal output from the main CPU 11, the output of the NOR circuit 176 is inverted into an "H" level signal and the strobe circuit 32 starts the light emission.

Light Emission Termination 1

When a quench permission signal is output from the main CPU 11 and the quantity of light received by the photodiode 131 (i.e., the integration level output from the integrating circuit 132) exceeds the optimum TTL–DA level output from the main CPU 11, the output of the NOR circuit 176 is inverted into an "L" level signal and light emission is terminated by the strobe circuit 32.

Light Emission Termination 2

In response to the completion of the quench signal output from the main CPU 11, the output of the OR circuit 175 is inverted into an "L" level signal and the output of the NOR circuit 176 is inverted into an "L" level signal, and light emission is terminated by the strobe circuit 32.

On the other hand, during light emission from the strobe, the main CPU 11 operates as follows:

First, the main CPU 11 calculates, on the basis of the ISO speed of the film (film speed) input by the DX-code decoding circuit 14, the optimum TTL–DA level corresponding to the optimum integration level provided by the integrating circuit 132, which corresponds, in turn, to the optimum quantity of light emitted from the strobe 30.

In addition, the main CPU 11 calculates, after AF processing, based on the object distance data input by the distance code plate 23 and the aperture value set with a given correction, the first and second guide numbers and then determines first and second (time) limit durations corresponding to these guide numbers from the data conversion table shown in FIG. 8. It should be understood that the first limit duration (the first limit time) shorter than the optimum strobe flashing duration (the optimum strobe emission time) and the second limit duration (the second time limit) is longer than the optimum strobe flashing duration, depending on the object distance data and the preset aperture value.

During strobe light emission processing, the main CPU 11 outputs the quench permission signal when the first limit duration has elapsed, but before the optimum strobe flashing duration has completely elapsed, and outputs the compulsion quench signal when the second limit duration elapses, after the optimum strobe flashing duration has completely elapsed.

More specifically, the light control circuit 17 controls the strobe 30 to maintain its light emission even after the integration level, provided by the integrating circuit 132, becomes lower than the TTL–DA level, since the main CPU 11 outputs no quench permission signal before the first limit duration, which is shorter than the optimum strobe flashing duration by a given length of time, elapses. The strobe 30 terminates its light emission only when the first limit duration has elapsed and the quench permission signal has been output from the main CPU 11. In this manner, an unacceptable under-exposure can be avoided.

Even if the integration level provided by the integrating circuit 132 becomes lower than the TTL–DA level after the first limit duration has elapsed, proper exposure can be achieved, since the quench permission signal, which has already been output from the main CPU 11, immediately terminates further light emission from the strobe 30.

On the other hand, even if the integration level provided by the integrating circuit 132 does not become lower than the TTL–DA level before the second limit duration, which is longer than the optimum strobe flashing duration by a given length of time, elapses, an excessive over-exposure can be avoided, since the compulsion quench signal is output from the main CPU 11 when the second limit duration has elapsed.

Figure 6:
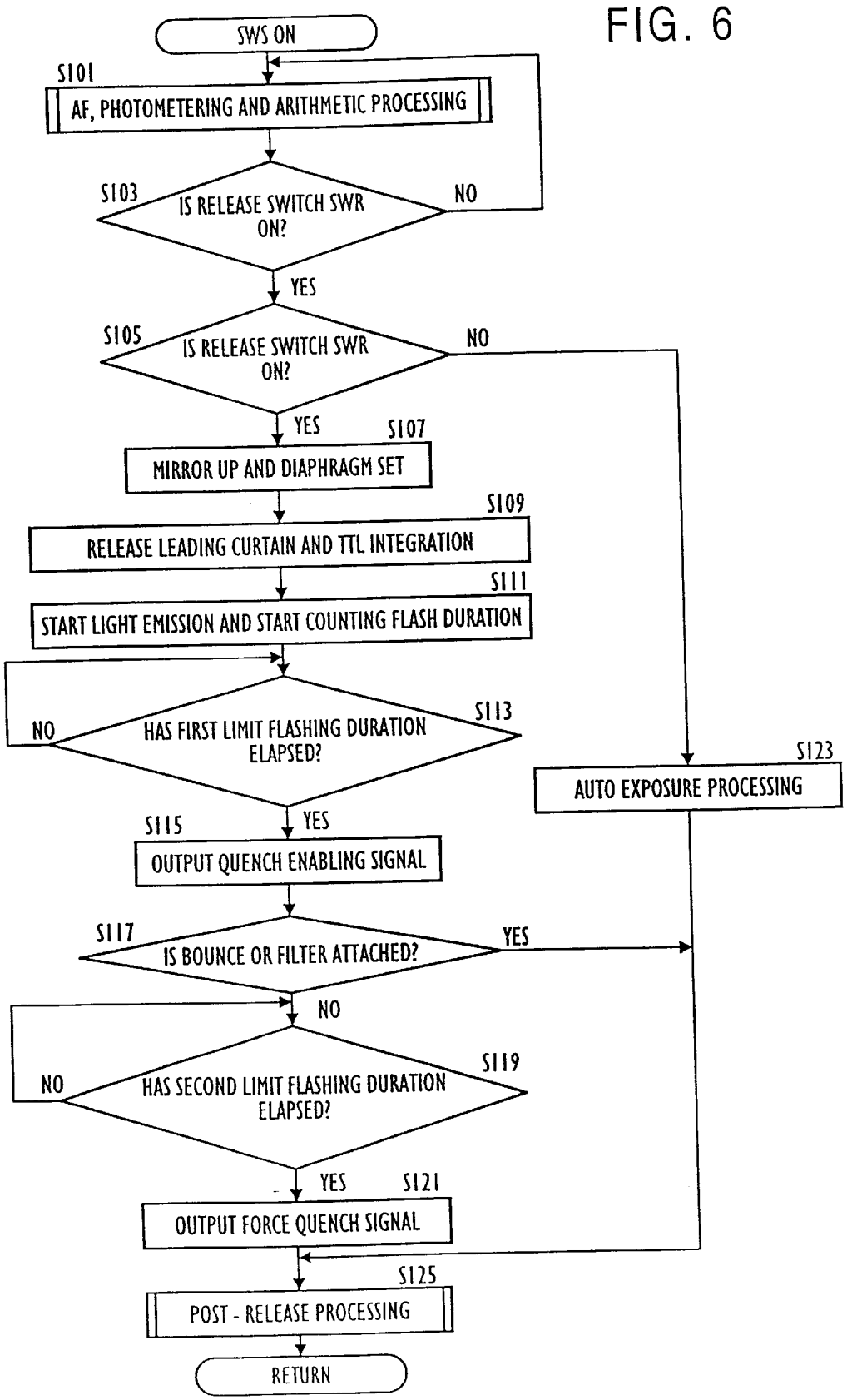
FIG. 6 is a flow chart illustrating a sequential operation for strobe flashing for the single lens camera shown in FIG. 1.

This first embodiment of strobe flashing control will be described more specifically with reference to the flow chart shown in FIG. 6. This flow chart begins on the assumption that the photometric switch has been turned ON. This process is executed by the main CPU 11, based on a program stored in the ROM of the main CPU 11. It should be understood that the process shown in FIG. 6 refers to the control of the light emission of the strobe by the main CPU 11. While other processes will be required which cannot be controlled by the main CPU 11, or when it is desired to prohibit light emission, these processes will not be described here.

Aperture value data and focal length data from the lens CPU 21 and guide number data and table data from the strobe CPU 31, are inputted into the main CPU 11. Auto focusing (AF) is commenced, then the optimum strobe flashing duration, the optimum TTL–DA level, then the first limit duration (limit 1) which is shorter than the optimum strobe flashing duration by a given length of time and the second limit duration (limit 2) which is longer than the optimum strobe flashing duration by a given length of time, are calculated on the basis of the distance data, the strobe information, the film speed and the aperture value data (step S101). These lengths of time preferably correspond to a guide number of approximately 1, but may be higher or lower. Absolute values of these lengths of time may be identical to each other or different from each other.

At S103 it is checked whether or not the release switch SWR has been turned ON. If not, control returns to step S101, until such a time that the release switch SWR is turned ON.

When the release switch SWR has been turned ON, and it has been determined that the strobe 30 is ready for flashing, the mirror 41 is swung upward, the diaphragm 24 is adjusted, the leading curtain of the shutter 16 is released and simultaneously an integration start signal is output to initiate TTL integration (steps S105, S107, S109). If the strobe 30 is not ready for flashing, for example, due to incomplete charging, the process will be executed without flashing of the strobe (step S123).

The strobe flashing signal is output and the strobe 30 (flashing circuit 32) is controlled to start light emission and simultaneous counting of the flash duration begins (step S111).

The main CPU 11 outputs the quench permission signal when the first limit flashing duration has elapsed (steps S113, S115). When an inverted output level of the integrating circuit 132 becomes lower than the optimum TTL–DA level and integration is complete, the external strobe 30 terminates flashing. More specifically, both inputs of the AND circuit 174 are converted into an "H" level signal and a strobe flashing terminate signal ("L" level) is output from the NOR circuit 176. In response to this signal, the strobe circuit 32 terminates the light emission.

Other than when "bouncing" the flash or when using a filter, the integration counter is responsive to the quench permission signal to check whether the second limit of flashing duration has elapsed or not. If the second limit of flashing duration has elapsed, then the force quench signal is output (steps S117, S119, S121). This completion quench signal converts the output of the OR circuit 175 into an "H" level signal and the output of the NOR circuit 176, i.e., the strobe control signal is converted into the quench signal having an "L" level with which the strobe 30 terminates its flashing. In the case of a "bounced" flash or when using a filter (step S117), the process to terminate further light emission, based on the second limit of flashing duration, is not performed, so the routine skips steps S119 and S121 and proceeds to the post-release process (step S125). The post-release process involves release of the shutter following curtain, return of the mirror, diaphragm resetting, film transport, shutter charge etc.

Figure 7:
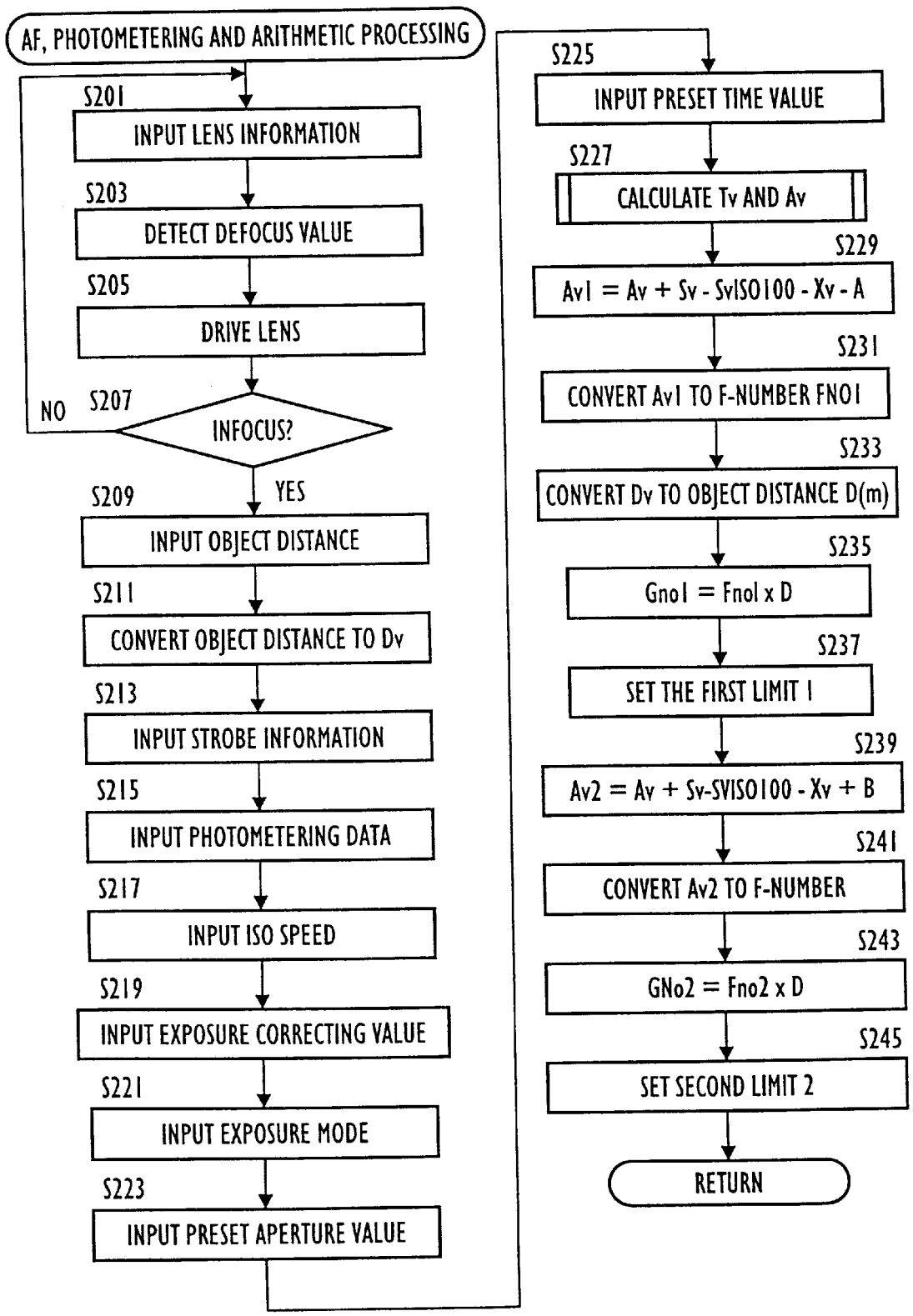
FIG. 7 is a flow chart illustrating a subroutine, of the flow chart of FIG. 6, for AF-photometric and arithmetic processing.

The subroutine of step S101 will be described in detail with reference to the flow chart of FIG. 7.

Lens information including the maximum aperture value, the minimum aperture value, focal length data and information regarding whether the filter has been attached or not, is input from the lens CPU 21 (step S201). Defocus information is input from the AF sensor 47 and a defocusing amount is detected (step S203). The focusing lens (not shown) is driven according to the detected defocusing amount (step S205). The steps S201 through S207 are repeated until focusing has been achieved.

After focusing has been achieved, object distance information is input from the zoom lens 20 and this object distance information is converted into a Dv value suitable for use in an APEX (Additive system of Photographic Exposure) (steps S209, S211) equation.

Information regarding the strobe, such as, guide number, whether the capacitor has been completely charged or not and whether the strobe is being used for "bouncing", are inputted from the strobe CPU 31 (step S213).

Field luminance information is input from the photometric sensor unit 12 and is converted into a Bv value, the DX-code is input from the DX-code decoding circuit 14 or, though not shown, the manually set film speed information is input, and is converted into a corresponding film speed value Sv (steps S215, S217). Then, the exposure correction value Xv is input (step S219). An exposure mode, for example, program exposure mode, aperture value priority exposure mode, shutter speed priority exposure mode or manual exposure mode, is also input (step S221). This is followed by inputting the preset aperture value Av and the preset shutter speed (time value) Tv (steps S223, S225). It should be understood that in this embodiment the aperture value Av and the shutter speed Tv are stored in and set by the main CPU 11.

When the predetermined data has been input, the shutter speed Tv and the aperture value Av are calculated depending on the exposure mode, and are calculated in accordance with the following equation:

$$Bv+Sv-Xv=Tv+Av \text{ (step S227)}$$

A first aperture value Av1 for the APEX equation is calculated follows:

$$Av1=Av+Sv-Sv_{ISO100}-Xv-A \text{ (step S229)}$$

where, $Sv_{ISO100}$ represents an APEX conversion value for ISO100. A first F-number Fno1 is calculated based upon Av1 (step S231), the object distance information Dv used in the APEX equation is converted into an object distance D(meters) (step S233) and a first guide number Gno1 is calculated according to the following equation:

$$Gno1=Fno1 \times D \text{ (step S235)}$$

Based on the table data of FIG. 8, the first limit duration (limit 1) corresponding to the first guide number Gno1 is set (step S237).

Similarly, a second aperture value Av2 for the APEX equation is calculated according to the following equation:

$$Av2=Av+Sv-Sv_{ISO100}-XV+B \text{ (step S239)}$$

Based on this equation, a second F-number Fno2 is calculated (step S241). A second guide number Fno2 is calculated (step S243) according to the following equation:

$$Gno2=Fno2 \times D \text{ (step S243)}$$

Then, the second limit duration (limit 2) corresponding to the second guide number is set on the basis of the table data of FIG. 8 (step S245).

In the above equations, "A" is an APEX value used to set the first limit duration shorter than the optimum flashing duration by a given length, and "B" is an APEX value used to set the second limit duration longer than the optimum flashing duration by a given length.

By a series of processes, the first limit duration is shorter than the optimum flashing duration by an amount corresponding to the APEX value A, and the second limit duration is longer than the optimum flashing duration by an amount corresponding to the APEX value B.

According to this embodiment the first and second limit durations, obtained in the manner as has been described above, are utilized so that, the quantity, even the optimum quantity, of light received by the photodiode 131 can be maintained until the first limit duration elapses and thereby an excessive under-exposure may be avoided. After the first limit duration has elapsed, the strobe terminates its flashing when the optimum quantity of received light is reached or when the second limit duration elapses and thereby an excessive over-exposure is also avoided.

However, strobe light control in an the ordinary photographing mode should not be used when flash is "bounced" or when a filter is attached to the photographing lens, since this would often lead to under-exposure. To avoid this, this embodiment is arranged so that the flashing duration is not limited by the second limit duration when flash is used in a "bounce" mode or when a filter is attached during photographing.

Figure 9:
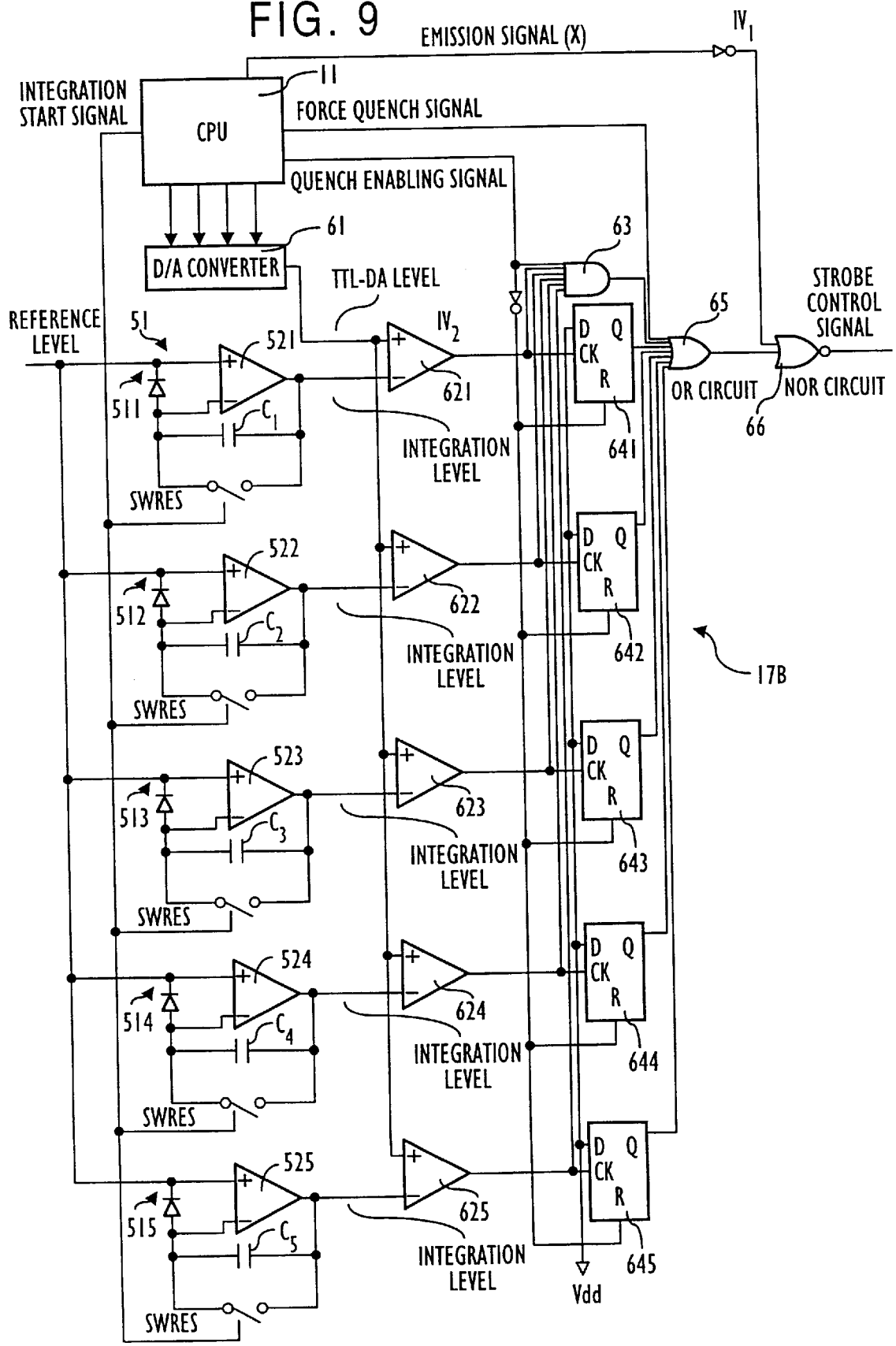
FIG. 9 is a block diagram illustrating a multi-photometric sensor and a light control circuit according to a second embodiment of the invention.

According to the first embodiment of the first aspect of the present invention, described hereinabove, the photometric sensor unit 13 comprises a single photodiode 131. FIG. 9 is a circuit diagram showing a second embodiment of the light control circuit employing a plurality of photodiodes or a photometric sensor unit having a plurality of independent light receiving areas.

In FIG. 9 a light control circuit 17B employs a photometric sensor unit comprised of five photometric areas, i.e., five photodiodes 51 (511 through 515).

Integrating circuits 521 through 525 are provided, and independently integrate outputs of the respective photodiodes 511 through 515. Each of these integrating circuits is arranged in the same way as the integrating circuit used in the first embodiment of the first aspect illustrated in FIG. 4. The optimum TTL–DA level, calculated by the main CPU 11 and converted by the D/A converter 61 into an analog signal, is compared with the outputs of the respective integrating circuits 521 through 525, by independent comparators 621 through 625, respectively. The outputs of the comparators 621 through 625 are inverted into an "H" level signal, as the respective integration levels become lower than the optimum TTL–DA level. Consequently the respective comparators 621 through 625 output the integration over-signals.

Outputs of the respective comparators 621 through 625 are input into CK inputs of independent D flip-flops 641 through 645 having D-inputs normally applied with Vdd's of an "H" level and R-inputs are applied with quench permission signals that have been output from the main CPU 11 and inverted by inverter $IV_2$. Q-outputs of the respective D flip-flops 641 through 645 are input to an OR circuit 65.

More specifically, when integrations have been completed after the quench permission signal has been output and the outputs of the respective comparators 621 through 625 have risen to an "H" level, the Q-outputs of the respective D flip-flops 641 through 645 are thereby inverted into an "H" level. Accordingly, the Q-outputs of the respective D flip-flops 641 through 645 are not inverted to an "H" level, even if any one or more of the integrating circuits 511 through 515 provides or provide integration value(s) higher than the optimum TTL–DA level and the output(s) from the associated one or more of the comparators 621 through 625 rises or rise to an "H" level, before the quench permission signal is output.

The quench signal output from the main CPU 11 is also applied to an AND circuit 63, to which the outputs of the respective comparators 621 through 625 are also applied. Accordingly, the output of the AND circuit 63 is changed from an "L" level to an "H" level when the quench enabling signal is output from the main CPU 11 and the outputs of the respective comparators 621 through 625 are inverted to an "H" level. The output of the AND circuit 63 together with the Q-outputs of the respective D flip-flops 641 through 645 pass to the OR circuit 65.

The output of the OR circuit 65 passes to an input of a NOR circuit 66. The flashing (emission) signal output from the main CPU 11 is inverted by an inverter $IV_1$ before being applied to the input of the NOR circuit 66. Output of the NOR circuit 66 passes, in turn, to the strobe circuit 32 as the strobe control signal (trigger/quench signal).

The operation of the light control circuit will be described in detail with reference to the timing chart shown in FIG. 10. The output of the NOR circuit 66 is normally of an "L" level, but when the flashing signal is output, it is changed into a flashing signal (trigger signal) of an "H" level. In response to this signal, the strobe circuit 32 starts to flash.

On the other hand, the respective integrating circuits 521 through 525 start their integrations when the integration start signal output from the main CPU 11 opens the respective reset switches SWRES. It is assumed here that the integration levels of the second integrating circuit 522, the fourth integrating circuit 524, the first integrating circuit 521, the fifth integrating circuit 525 and the third integrating circuit 523 have successively reached, in this order, the optimum TTL–DA level, i.e., the comparators 622, 624, 621, 625 and 623 have successively provided the integration-over signals.

According to the second embodiment of the first aspect of the present invention, the quench enabling signal is output from the main CPU 11 after the second, fourth and first comparators 622, 624 and 621 have successively outputted the integration-over signals. Accordingly, the strobe 30 continues flashing even if the comparators, 622, 624 and 621 output the integration-over signals.

After a quench permission signal is outputted to the NOR circuit 66, a quench signal, in response to the integration-over signal, is outputted from the fifth comparator 625, i.e., the quench signal is outputted immediately after the integration-over signal.

During the above described operation, the main CPU 11 outputs the quench enabling signal as soon as the first limit duration has elapsed and outputs the compulsion quench signal when the second limit duration elapses, just as in the first embodiment which was described with reference to FIGS. 6 and 7.

According to the second embodiment of the first aspect of the present invention, the strobe continues flashing until the first limit duration, which is shorter than the optimum exposure duration by a given length, elapses and thus an excessive under-exposure is avoided.

The strobe ends flashing immediately when any one of the integration levels outputted from the photodiodes 511 through 515 value reaches the optimum TTL–DA level, after the first limit duration has elapsed. In this way a proper exposure is achieved.

If none of the integration levels outputted from the photodiodes 511 through 515 reach the optimum TTL–DA level, even after the second limit duration has elapsed, the compulsion quench signal is output from the main CPU 11, just as in the first embodiment and thereby flashing is terminated. In this way an excessive over-exposure is avoided. However, it should be noted that in this embodiment the compulsion quench signal is not output from the main CPU 11 when a filter is attached or when the flash is being "bounced".

In an alternative arrangement of the second embodiment, it is possible that strobe flashing is terminated when the photometric sensor selected by the photographer reaches the optimum quantity of received light. While the embodiments have been described with respect to an external strobe, the invention is applicable in the case in which a built-in strobe is used alone or together with an external strobe.

Now third and fourth embodiments of the first aspect of the present invention will be described with reference to FIGS. 11 through 17. The third and fourth embodiments are characterized in that, in contrast with the first and second embodiments previously described, no compulsion quench signal is output and no consideration is given as to whether the filter is attached to the photographing lens or not, or whether the flash is being "bounced" or not.

Figure 12:
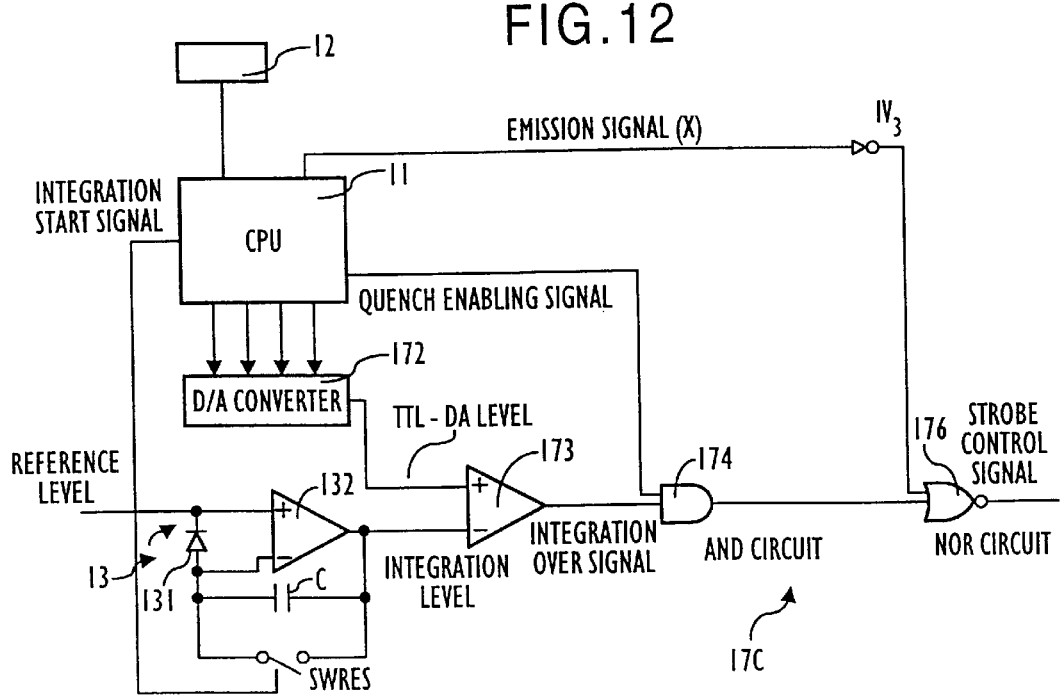
FIG. 12 is a block diagram illustrating details of a light control circuit in the third embodiment of the present invention.
Figure 13:
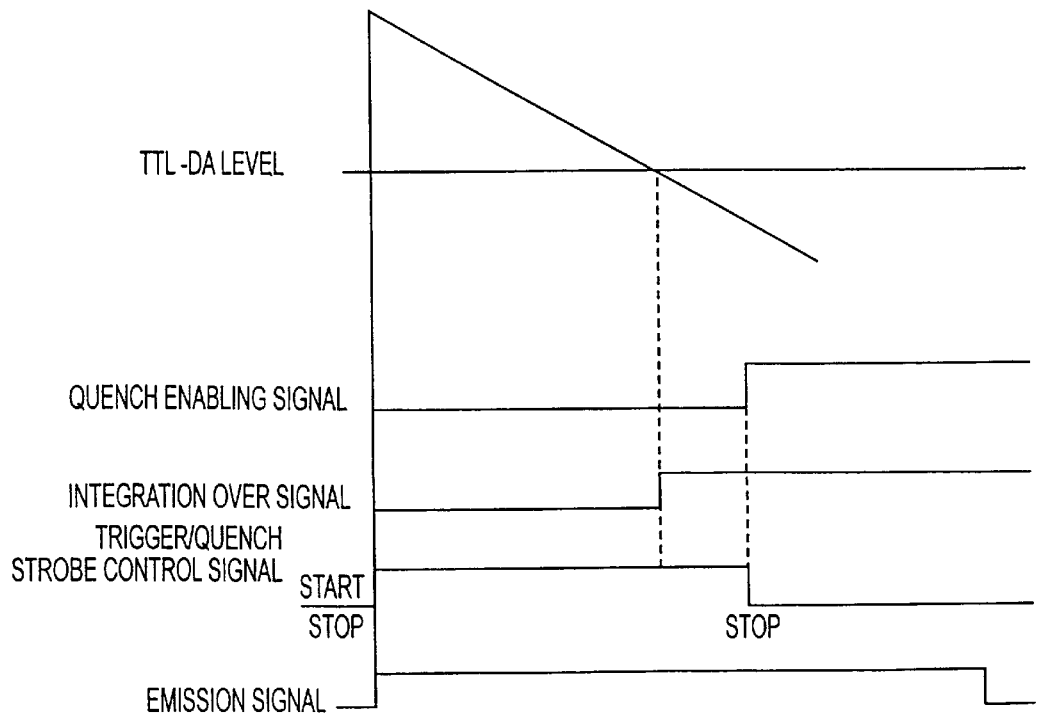
FIG. 13 is a timing chart illustrating a sequential operation of the light control circuit shown in FIG. 12.

FIG. 12 is a circuit diagram showing a third embodiment of the first aspect of the present invention, and FIG. 13 is a timing chart illustrating a sequential operation of the light control circuit shown in FIG. 12. Light control circuit 17C is characterized in that an output of the AND circuit 174 is input not via the OR circuit 175, but directly into the NOR circuit 176. Therefore no compulsion quench signal is output from the main CPU 11.

The main CPU 11 outputs the integration start signal with which the reset switch SWRES is actuated and thereby the integrating capacitor C is discharged. The integrating circuit 132 then begins to integrate the output of the photodiode 131. The integration value outputted from the integrating circuit 132 is input to an inverted input terminal of the comparator 173.

Based on the object distance information input from the lens CPU 21, the film speed input from the DX-code decoding circuit 14, the aperture value information input from the lens CPU 21, the illumination characteristic data input from the strobe CPU 31 etc., the main CPU 11 calculates the optimum flashing duration of the external strobe 30. Additionally, the main CPU 11 calculates the optimum integration level (the optimum TTL–DA level) based on the film speed. The calculated TTL–DA level is converted by the D/A converter 172 into a corresponding analog signal and input to a non-inverted input terminal of the comparator 173.

The comparator 173 compares the integration level output from the integrating circuit 132 with the TTL–DA level and outputs the integration-over signal ("H" (high) level signal) when the integration value exceeds the TTL—DA value.

When the quench enabling signal is output from the main CPU 11 and the comparator 173 outputs the integration-over signal, the output of the AND circuit 174 is inverted into an "H" level.

Output of the AND circuit 174 is applied to one input of the NOR circuit 176. Into another input of the NOR circuit 176 is applied a flashing signal from the main CPU 11, via an inverter $IV_3$. Specifically, when the output of the AND circuit 174 is of an "L" (low) level and the flashing signal is of an "H" level, the output of the NOR circuit 176, i.e., the strobe control signal is a trigger signal of "H" level, otherwise the strobe control signal will be a quench signal of an "L" level.

In response to the strobe control signal output from the NOR circuit 176, the strobe circuit 32 will be triggered to flash if the strobe control signal is of an "H" level and will terminate flashing if the strobe control signal is of an "L" level.

According to this embodiment, the light control circuit 17C operates during the strobe flashing as follows:

Start Light Emission

When the strobe flashing signal is output from the main CPU 11, the output of the NOR circuit 176 is inverted to an "H" level and the strobe circuit 32 starts flashing.

Light Emission Termination 1

When the quench enabling signal is output from the main CPU 11 and the quantity of light received by the photodiode 131 (i.e., the integration value output from the integrating circuit 132) exceeds the TTL–DA level output from the main CPU 11, the output of the NOR circuit 176 is inverted to an "L" level and the strobe circuit 32 terminates flashing. On the other hand, the main CPU 11 operates during light emission from the strobe as follows: First, the main CPU 11 calculates, on the basis of ISO speed of the film input by the DX-code decoding circuit 14, the optimum TTL–DA level corresponding to the optimum integration value output from the integrating circuit 132, which corresponds, in turn, to the optimum quantity of light emitted from the strobe 30.

In addition, the main CPU 11 calculates, after AF processing, on the basis of the object distance information input from the distance code plate 23 and the aperture value set with a given correction, a guide number and then determines a limit duration corresponding to this guide number from the data conversion table shown in FIG. 8. It should be understood that this limit duration is shorter than the optimum flashing duration based on the object distance information and the preset aperture value.

During the strobe light emission processing, the main CPU 11 outputs the quench enabling signal as soon as the limit duration has elapsed, before the optimum flashing duration elapses.

Accordingly, this embodiment of the light control circuit 17 continues strobe flashing even after the integration level output from the integrating circuit 132 has exceeded the TTL–DA level because the main CPU 11 outputs no quench signal before the limit duration elapses, and terminates light emission from the strobe 30 only after the limit duration has elapsed, so an excessive under-exposure is avoided.

On the other hand, when the integration level output from the integrating circuit 132 exceeds the TTL–DA level after the limit duration has elapsed, the strobe 30 immediately terminates its flashing because the quench enabling signal has already been output from the main CPU 11, so a proper exposure is achieved.

Figure 14:
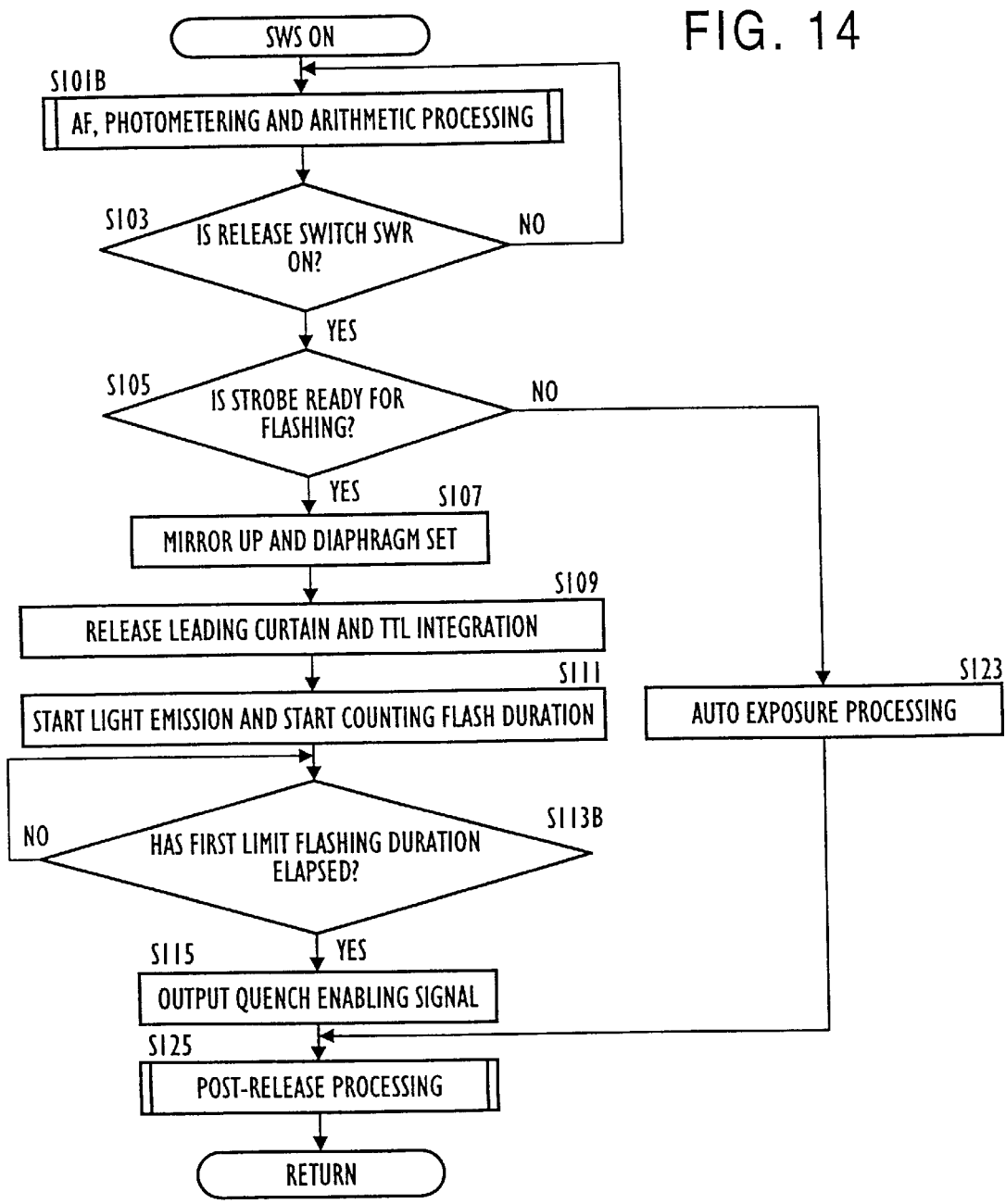
FIG. 14 is a flow chart illustrating a sequential operation of a third embodiment of a single lens reflex camera, concerning the strobe light emission.
Figure 15:
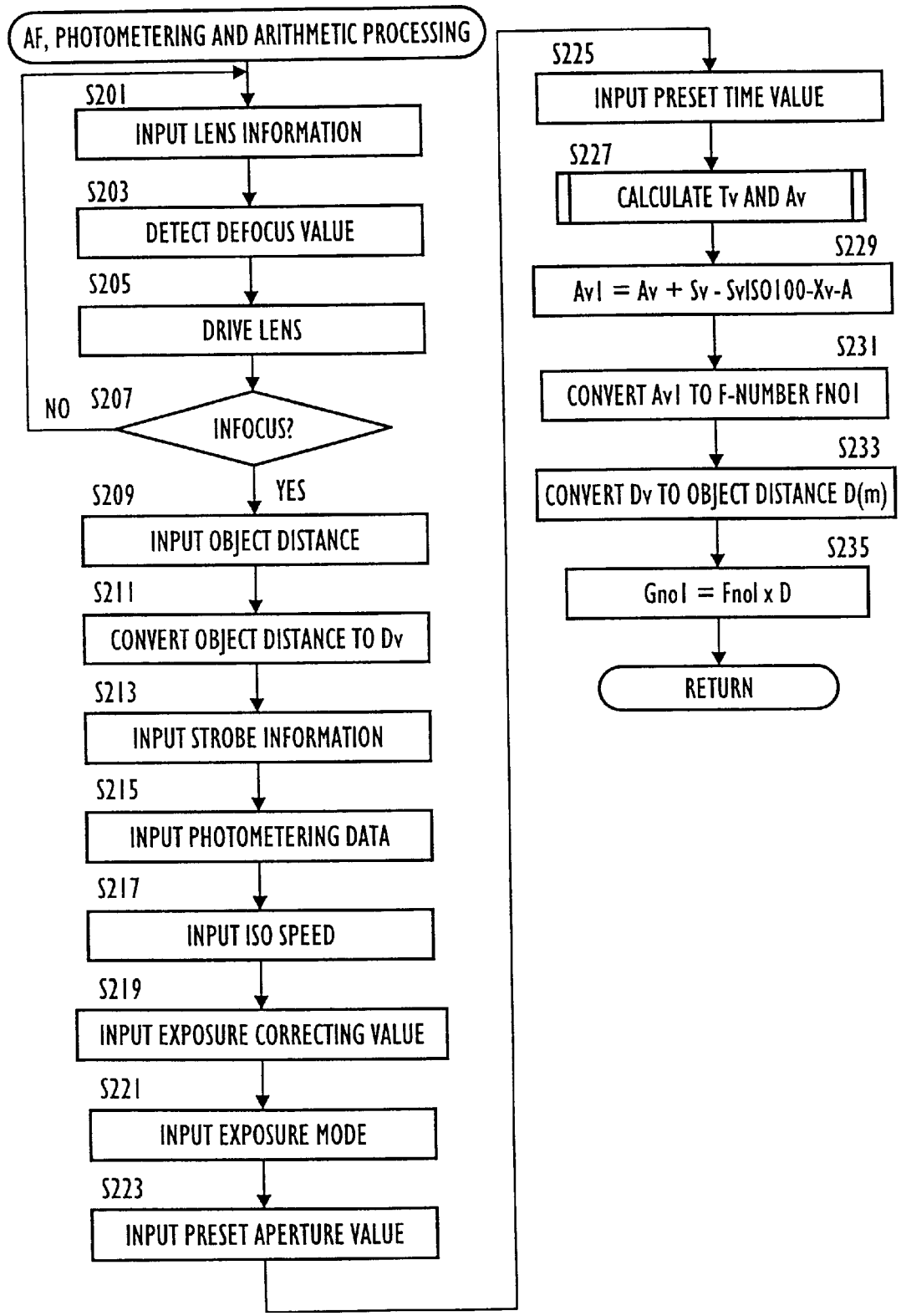
FIG. 15 is a flow chart illustrating a subroutine, of the flow chart of FIG. 14, for AF, photometric and arithmetic processing.

FIGS. 14 and 15 are flow charts illustrating the third embodiment of the strobe flashing control. This embodiment differs from the first embodiment illustrated by the flow chart of FIG. 6 in that it is not checked whether the filter is attached to the photographing lens or not (step S117), or whether the flash is being "bounced", and the strobe flashing duration is not limited by the second limit duration (step S119).

The subroutine of step S101B is shown in FIG. 15. Steps S201 through S235 of this subroutine are identical to steps S201 through S235 of the subroutine shown in FIG. 7. These steps calculate the limit duration which is shorter than the optimum flashing duration by an APEX value A.

According to this third embodiment, any excessive under-exposure can be avoided by utilizing said limit duration, since the strobe flashing is maintained until the limit duration elapses even if the quantity of light received by the photodiode 131 reaches the optimum quantity of received light before the limit duration shorter than said given length elapses. After the limit duration has elapsed, the strobe 30 terminates its flashing when the limit duration has elapsed and therefore excessive over-exposure can be also avoided.

Figure 16:
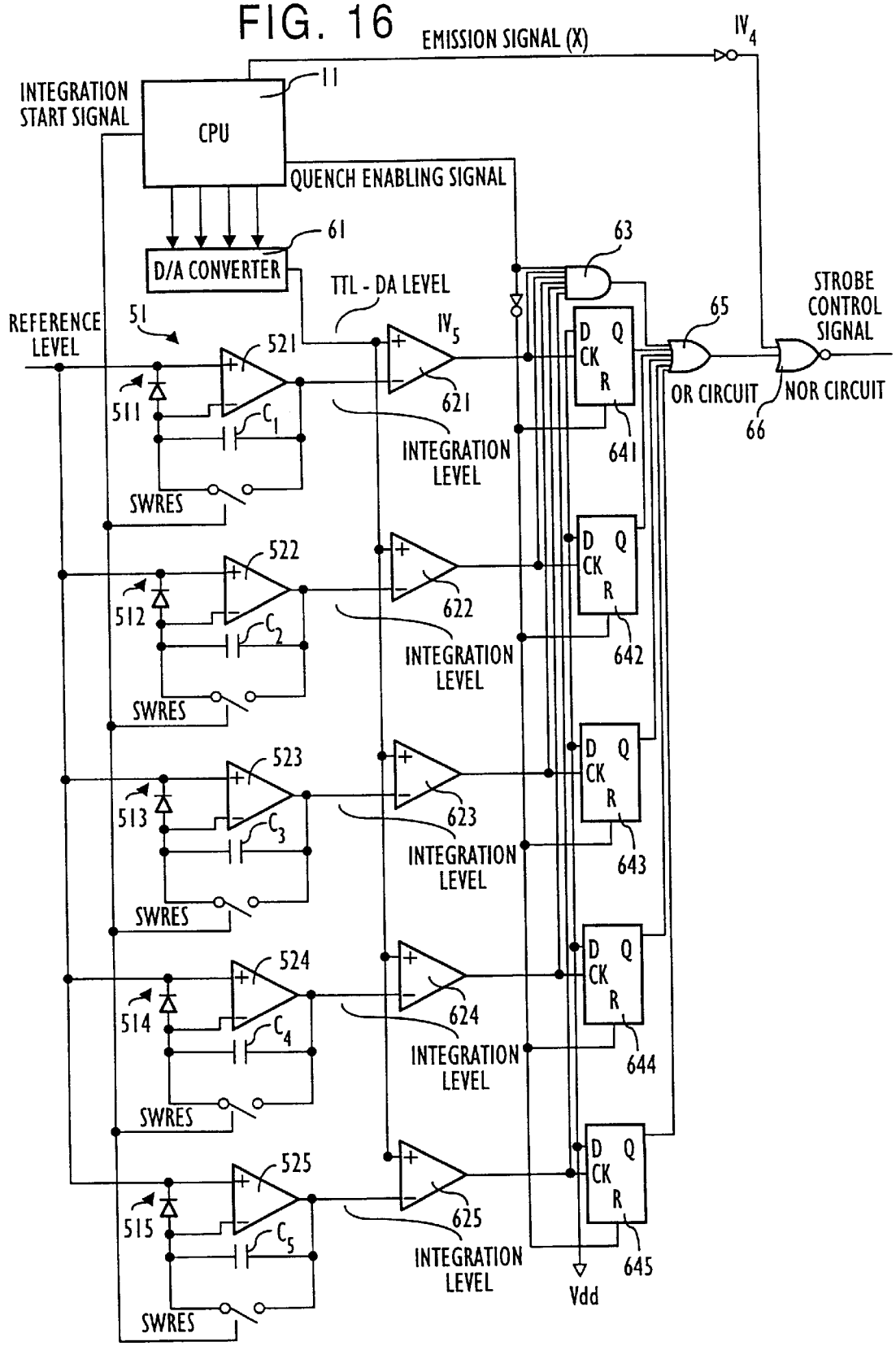
FIG. 16 is a block diagram illustrating a multi-photometric sensor and a light control circuit according to a fourth embodiment of the invention.

According to the third embodiment just described, the photometric sensor unit 13 comprises a single photodiode 131. FIG. 16 is a circuit diagram showing a fourth embodiment of the light control circuit employing a plurality of photodiodes or a photometric sensor unit having a plurality of independent light receiving areas. This embodiment is similar to the second embodiment shown in FIG. 9 except that the compulsion quench signal is not output from the main CPU 11.

The photometric sensor unit comprises five photometric areas, i.e., five photodiodes 51 (511 through 515). Integrating circuits 521 through 525 are provided, and independently integrate outputs of the respective photodiodes 511 thorough 515. Each of these integrating circuits is arranged in the same way as the integrating circuit used in the first embodiment, as illustrated in FIG. 4. The optimum TTL–DA level calculated by the main CPU 11, and converted by the D/A converter 61 into an analog signal, is compared with the outputs of the respective integrating circuits 521 through 525, by independent comparators 621 thorough 625, respectively. The outputs of the comparators 621 through 625 are inverted to an "H" level signal as the respective integration levels become lower than the optimum TTL–DA level. Consequently, the respective comparators 621 through 625 output the integration-over signals.

Outputs of the respective comparators 621 through 625 are input into CK inputs of independent D flip-flops 641 through 645 having D-inputs normally applied with Vdds of an "H" level and R-inputs are applied with quench enabling signals that have been output from the main CPU 11 and then inverted by an inverter IV$_5$. Q-outputs of the respective D flip-flops 641 through 645 are input to an OR circuit 65.

More specifically, when integrations have been completed after the quench permission signal has been output and the outputs of the respective comparators 621 through 625 have risen to an "H" level, the Q-outputs of the respective D flip-flops 641 through 645 are thereby inverted to an "H" level. Accordingly, the Q-outputs of the respective D flip-flops 641 through 645 are not inverted to an "H" level, even if any one or more of the integrating circuits 521 through 525 provides or provide integration level(s) higher than the optimum TTL–DA level and the output(s) from the associated one or more of the comparators 621 through 625 rises or rise to an "H" level before the quench permission signal is output.

The output of the OR circuit 65 passes to the input of the NOR circuit 66. The flashing signal output from the main CPU 11 is inverted by an inverter IV$_4$ before passing into the input of the NOR circuit 66. The output of the NOR circuit 66 passes to the strobe circuit 32 as the strobe control signal (trigger/quench signal).

Figure 17:
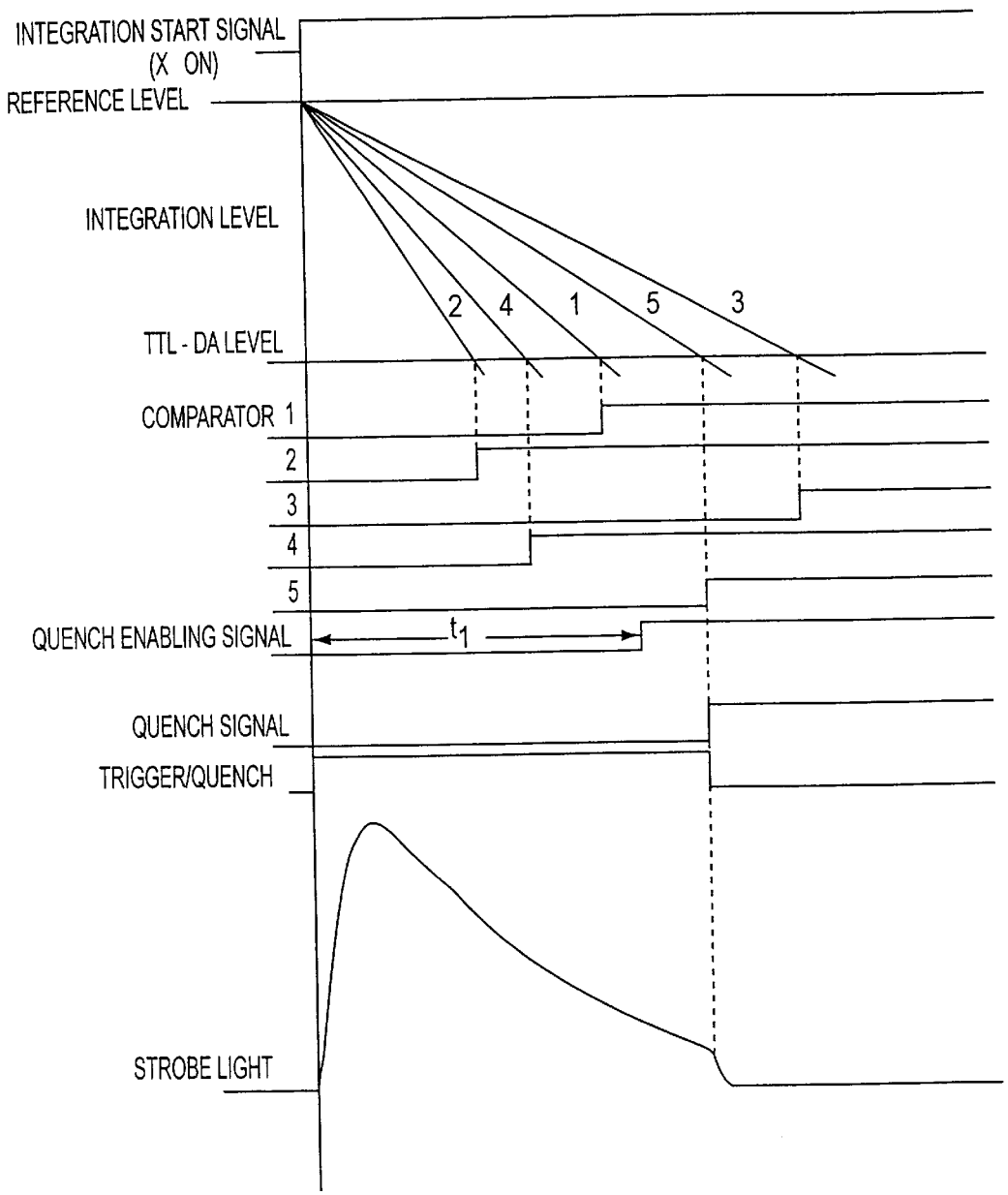
FIG. 17 is a timing chart illustrating a sequential operation of the fourth embodiment.

The operation of the light control circuit will described in detail with reference to the timing chart shown in FIG. 17. The output of the NOR circuit 66 is normally of an "L" level, when the flashing signal is output, it is changed into a flashing signal (trigger signal) of an "H" level. In response to this signal, the strobe circuit 32 starts to flash.

On the other hand, the respective integrating circuits 521 through 525 start their integrations when the integration start signal output from the main CPU 11 closes and immediately thereafter opens the reset switch SWRES. It is assumed here that the integration values of the second integrating circuit 522, the fourth integrating circuit 524, the first integrating circuit 521, the fifth integrating circuit 525 and the third integrating circuit 523 have successively reached, in this order, the optimum TTL–DA level, i.e., the comparators 622, 624, 621, 625 and 623 have successively provided, in this order, the integration-over signals.

According to the fourth embodiment, the quench enabling signal is output from the main CPU 11 after the second, fourth and first comparators 622, 624 and 621 have successively provided the integration-over signals. Accordingly, the strobe 30 continues its flashing even if the comparators 622, 624 and 621 output the integration-over signals.

The integration-over signal (integration-over signal output from the fifth comparator 625) output first, after the quench enabling signal has been output, causes the NOR circuit 66 to output the quench signal in response to which the strobe 30 terminates its flashing.

According to this fourth embodiment, the strobe continues its flashing until the limit duration elapses and thus an excessive under-exposure is avoided.

The strobe terminates its flashing in synchronization with any one of the direct photometric sensors for which the integration value reaches the optimum TTL–DA level first after the limit duration has elapsed and therefore a proper exposure is achieved.

According to the second embodiment, the strobe flashing is terminated in synchronization with the first completion of integration after the limit duration has elapsed. However, an alternative arrangement is also possible such that the strobe flashing is terminated when the photometric sensor selected by the photographer reaches the optimum quantity of received light. In this arrangement, a single photometric sensor selected by the photographer functions as the photometric sensor of the first embodiment.

While the embodiments have been described with respect to the external strobe, the invention is applicable to the case in which a built-in strobe alone is used or the built-in strobe is used together with the external strobe. When split photometric sensor is used, the number of splitting may be four or six or more. The number of sensors selected by the photographer after the limit duration has elapsed may be one or more so that the strobe flashing is terminated upon completion or integration by any one of these selected sensors.

As will be apparent from the foregoing description, the invention allows an excessive underexposure to be reliably avoided, since the light emission from the flashing means is maintained until the limit duration shorter than the optimum exposure duration by a given length elapses.

The invention not only allows an excessive overexposure to be reliably avoided but also allows a proper exposure to be achieved so far as a scene to be photographed lying at the object distance is concerned, since the light emission from the flashing means is maintained even if any of the light receiving means reaches the optimum quantity of received light before the limit duration shorter than the optimum exposure duration by a given length and the light emission is terminated only when the predetermined light receiving means reaches the optimum quantity of received light after the limit duration has elapsed.

The above-noted embodiments are directed to a control system (circuit) for controlling the external strobe 30 attached to an SLR camera. Hereinafter, a control system for controlling both the external strobe and a built-in strobe, to which a second aspect of the present invention is applied, will be explained in reference to FIGS. 18 through 32.

Figure 18:
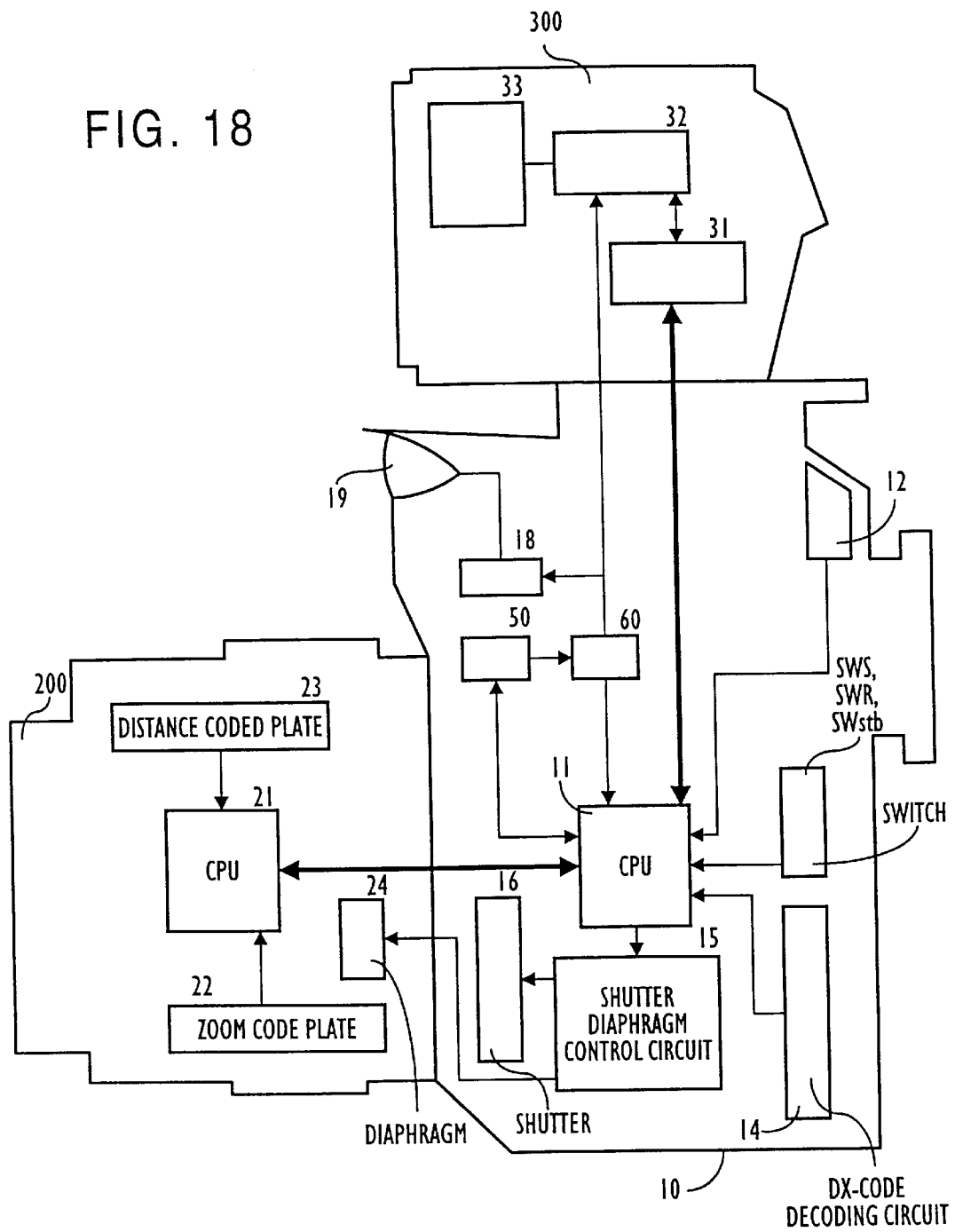
FIG. 18 is a block diagram illustrating some of the components of a control system in a first embodiment of single lens reflex camera having a multi-lamp light emission control apparatus on board, according to the second aspect of the present invention.

FIG. 18 shows some of the components of the control system of a single lens reflex camera provided with an apparatus for controlling emissions of more than one strobe according to the second aspect of the present invention. In FIG. 18 parts similar to those in FIG. 1 are designated by the same reference numbers. The SLR camera shown in FIG. 18 has a camera body 100 to which a zoom lens 200 and an external strobe 300 are detachably attached. The camera body 100, the zoom lens 200 and the external strobe 300 are provided with a main CPU 11, a lens CPU 21 and a strobe CPU 31, respectively. The main CPU 11 is connected to the lens CPU 21 and the strobe CPU 31 through respective ports (not shown) connected through electrical contacts (not shown).

The camera body 100 is provided with an AE photometering sensor unit 12 and a TTL photometering sensor unit 50, which each receive incident light coming from a scene to be photographed through the zoom lens 200. The camera body 100 is also provided with a DX-code decoding circuit 14, which acts as a film speed inputting means, for reading a DX-code printed on a film (not shown), through DX-code contact pins (not shown) formed on a side wall of the film chamber. All signals outputted from the AE photometering sensor unit 12, the TTL photometering sensor unit 50 and the DX-code decoding circuit 14 are inputted into the main CPU 11.

The camera body 10 is provided therein with a shutter/diaphragm controlling circuit 15 which serves as an exposure controlling system, and a strobe-emission control circuit 60 which serves as a strobe controlling system. The main CPU 11 actuates a shutter 16 of the camera body 100 and a diaphragm 24 of the zoom lens 20 through the shutter/diaphragm controlling circuit 15. The main CPU 11 also actuates the built-in strobe 19 and the external strobe 300 to emit flashlight through the strobe-emission control circuit 60.

The main CPU 11 measures a subject's luminance through the AE photometering sensor unit 12 and through an amount of light received on a film surface during an exposure (or an amount of light reflected upon shutter blades) through the TTL photometering sensor unit 50.

The main CPU 11 reads out the maximum aperture value, the minimum aperture value and the object distance information. The main CPU 11 performs calculations, such as, an exposure calculation etc., by converting the above-mentioned maximum aperture value, the minimum aperture value and the object distance information into APEX system values, i.e., a brightness value Av Bv, a speed value Av Sv, an aperture value Av and an object distance value Dv.

A photometering switch SWS and a release switch SWR for commencing a photographing operation, are connected to the main CPU 11. A strobe switch $SW_{stb}$ for commencing a charge up of an electrical capacitor of the strobe is connected to the main CPU 11. The main CPU 11 checks the ON/OFF state of each of the above switches, i.e., the photometering switch SWS, release switch SWR and strobe switch $SW_{stb}$ and carries out predetermined actions in accordance with the ON/OFF state of each switch.

The zoom lens 200 is provided with a zoom code plate 22 for detecting the current focal length of the zoom lens 200. The zoom lens 200 is further provided with a distance code plate 23 for detecting an object distance where a a focusing lens (not shown) is in an in-focus state. The lens CPU 21 reads current focal length data and current object distance data through the zoom code plate 22 and the distance code plate 23, respectively. The focusing lens of the zoom lens 200 is driven through an AF motor (not shown) and a lens drive mechanism (not shown) which are provided in the camera body 100.

The lens CPU 21 includes a ROM (not shown) which has various lens information stored, such as, the maximum aperture value (i.e., the maximum f-number) of the focus length of the zoom lens 200, the minimum aperture value (i.e., the minimum f-number) of the focus length of the zoom lens 200.

The external strobe 300 is provided with a strobe circuit 32 and an emitting unit 33. The strobe circuit 32 includes a strobe condenser (capacitor), a battery, etc. (all not shown).

The emitting unit 33 includes a xenon tube, a reflector, a Fresnel lens, etc. (all not shown).

The strobe CPU 31 includes a ROM (not shown) which has various data stored necessary for adjusting the illumination of the strobe 300, such as, the guide number (GN), illuminating angle and illumination characteristic data. This data is sent to the main CPU 11 when photographing. The illumination characteristic data of the strobe 300 is shown in FIG. 3, and refers to the relation between the emission time and emission amount of the external strobe 300 when light is emitted while the capacitator is fully charged.

Figure 19:
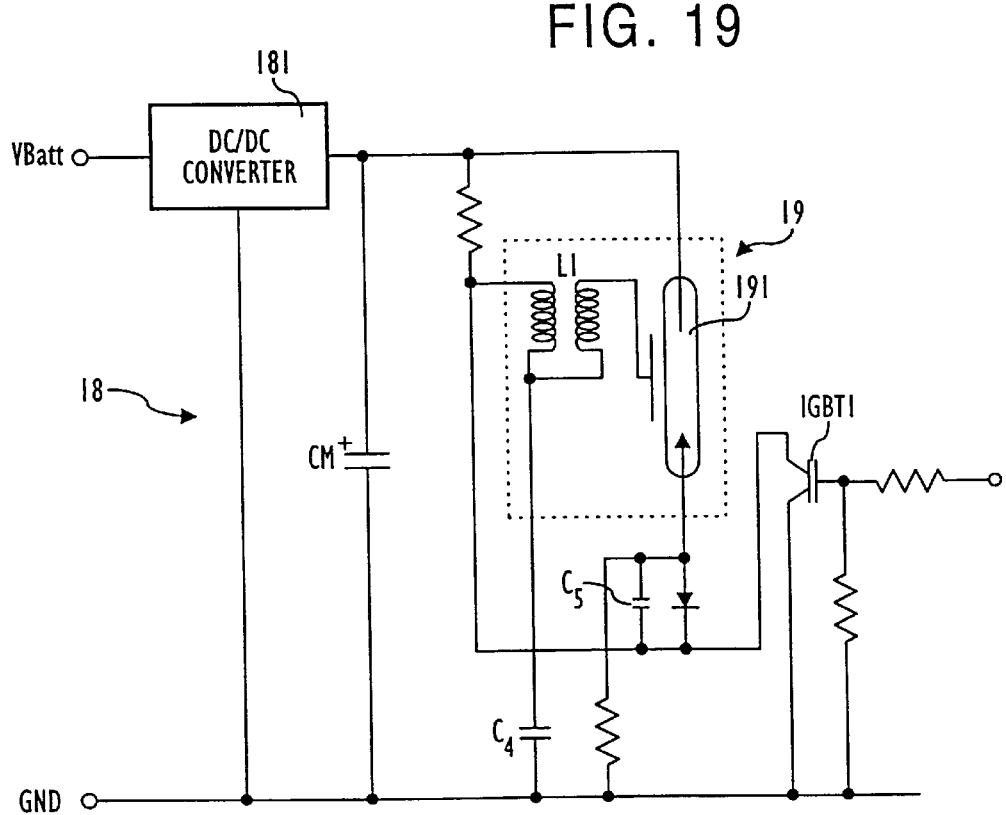
FIG. 19 is a circuit diagram illustrating a built-in strobe circuit of the single lens reflex camera shown in FIG. 18.

FIG. 19 shows an example of a strobe circuit 18 of the built-in strobe 19. A strobe circuit 32 of the external strobe 300 is similar to the strobe circuit 18 of the built-in strobe 19. When the strobe switch $SW_{stb}$ is turned ON, a DC/DC converter 181 starts operating to increase the battery voltage from a few volts to approximately 300 volts, in order to charge a condenser CM and sub-condensers C4, C5. The electrostatic amount W accumulated in the main condenser CM is represented by the following formula:

$$W = (\tfrac{1}{2}) \times C \times V^2 \text{(J: joule)}$$

wherein "C" represents the electric capacitance of the main condenser CM (F: farad); and "V" represents the terminal voltage (i.e., charged voltage) of the main condenser CM (V: volt).

When the trigger/quench terminal reaches an "H" (i.e., high) level, the collector terminal drops to the GND (ground) level since the switching transistor IGBT1 is turned ON, which turns over the polarity of the condenser C5, and consequently, about 600 volts is supplied to the xenon tube 191. On the other hand, since one of the primary terminals of a trigger coil L1 drops to the GND level, the electric charge accumulated in the condenser C4 flows through the primary side of the trigger coil L1. At this time, trigger voltage is generated on the secondary side of a trigger coil L2 (not shown) to thereby actuate the xenon tube 191 to discharge electricity, that is, to emit a flashlight. This electric discharge continues until the main condenser CM completes discharging its electricity during the time the "H" level of the trigger/quench terminal is maintained.

When the trigger/quench terminal drops to an "L" (i.e., low) level, the polarity of the condenser C5 turns back since the switching transistor IGBT1 is turned OFF, which stops the flow of electricity through the primary side of the trigger coil L1, and consequently, the xenon tube 191 stops discharging electricity. Thereafter, the main condenser CM, condensers C4 and C5 again start to be charged up.

The relation between the emission time "t" of a built-in strobe having a guide number of 14 and the guide number converted from the emission amount is the same as that of the embodiment shown in FIG. 3.

A flashlight-emission adjusting circuit 60 and peripheral circuits thereof are identical with those of the embodiment shown in FIG. 9. The TTL photometering sensor unit 50 is provided with five photometering areas, i.e., photodiodes 511, 512, 513, 514, 515 (see FIG. 20). The photodiodes 511, 512, 513, 514, 515 are connected between inversion input terminals and non-inversion input terminals of the integrating circuits 521, 522, 523, 524, 525, respectively. The integrating circuits 521, 522, 523, 524, 525 each integrate their outputs independent of one another. Each integrating circuit is provided with an integral calculation commencing switch SWRES which is normally closed. When an integral calculation commencing signal is outputted from the main CPU 11, the integral calculation commencing switch SWRES is opened to commence a new integral calculation.

The resulting outputs of the photodiodes 511, 512, 513, 514, 515 are inputted to inversion input terminals of the comparators 621, 622, 623, 624, 625, respectively.

Figures 20, 21:
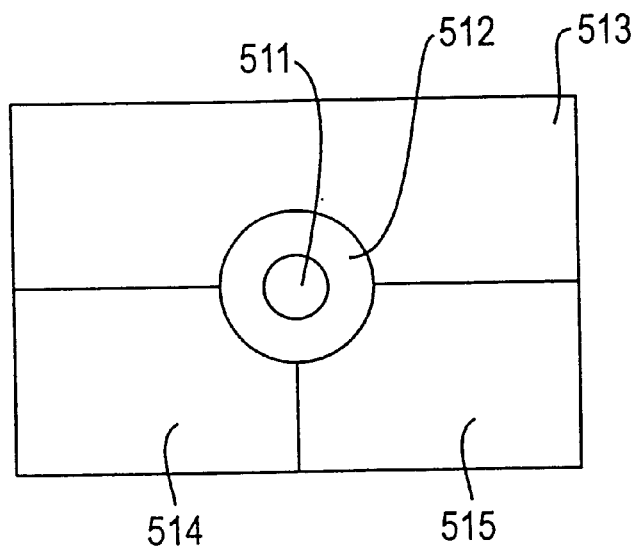
FIG. 20 is a diagram illustrating a photometric coverage of each light receiving element in the single lens reflex camera shown in FIG. 18.
FIG. 21 is a diagram illustrating a relationship between ISO speed and TTL–DA level.

The main CPU 11 calculates, as TTL–DA level, and an optimum integrated level (i.e., optimum voltage) of each of the integrating circuits 521, 522, 523, 524, 525, based on the film ISO speed information having been read through the DX-code decoding circuit 14. The calculated TTL–DA level is converted into analog signals, through the D/A converter 61, and is inputted to each non-inversion input terminal of the comparators 621, 622, 623, 624, 625. FIG. 21 shows one example of the relation between ISO speed information and TTL–DA level.

Each comparator 621, 622, 623, 624, 625 compares the integrated level (i.e., integrated output voltage) of the corresponding photodiode 511, 512, 513, 514, 515 with the inputted TTL–DA level. As a result of this comparison, in the case where the integrated level is below the inputted TTL–DA level, the output of the comparator changes from an "L" level to an "H" level, and consequently, each comparator outputs an integral calculation completion signal (integration over signal).

The output terminals of the comparators 621, 622, 623, 624, 625 are connected to inputs CK of the D flip-flop circuits 641, 642, 643, 644, 645, respectively. Vdd of constant "H" level is inputted to the D-input of each D flip-flop circuit 641, 642, 643, 644, 645, while the quench permission signal outputted from the main CPU 11 is inverted through the inverter $IV_2$ and inputted to the R-input of each D flip-flop circuit 641, 642, 643, 644, 645. The Q-output of each D flip-flop circuit 641, 642, 643, 644, 645 is inputted to the OR circuit 65.

With the above circuitry arrangement, in each comparator 621, 622, 623, 624, 625, when the output of comparator becomes an "H" level after the integral calculation is completed after the quench permission signal becomes an "H" level, the Q-output consequently changes to an "H" level. Therefore, the Q-output of each D flip-flop circuit 641, 642, 643, 644, 645 does not change to an "H" level even if the output of the corresponding comparator has changed to an "H" level following the completion of an integral calculation before the quench permission signal is outputted from the main CPU 11.

The quench permission signal outputted from the main CPU 11 is also inputted to the AND circuit 63. The output of each comparator 621, 622, 623, 624, 625 is also inputted to the AND circuit 63. Therefore, the output of AND circuit 63 turns to an "H" level when the quench permission signal is outputted from the main CPU 11 and all outputs of the comparators 621, 622, 623, 624, 625 become an "H" level. The output is inputted to the OR circuit 65.

The output of the OR circuit 65 is inputted to an input of the NOR circuit 66. The emission signal outputted from the main CPU 11 is inverted through the inverter $IV_1$ and inputted to another input of the NOR circuit 66. The output of the NOR circuit 66 is inputted to the strobe circuit 32 as a strobe control signal (i.e., trigger/quench signal).

Figure 22:
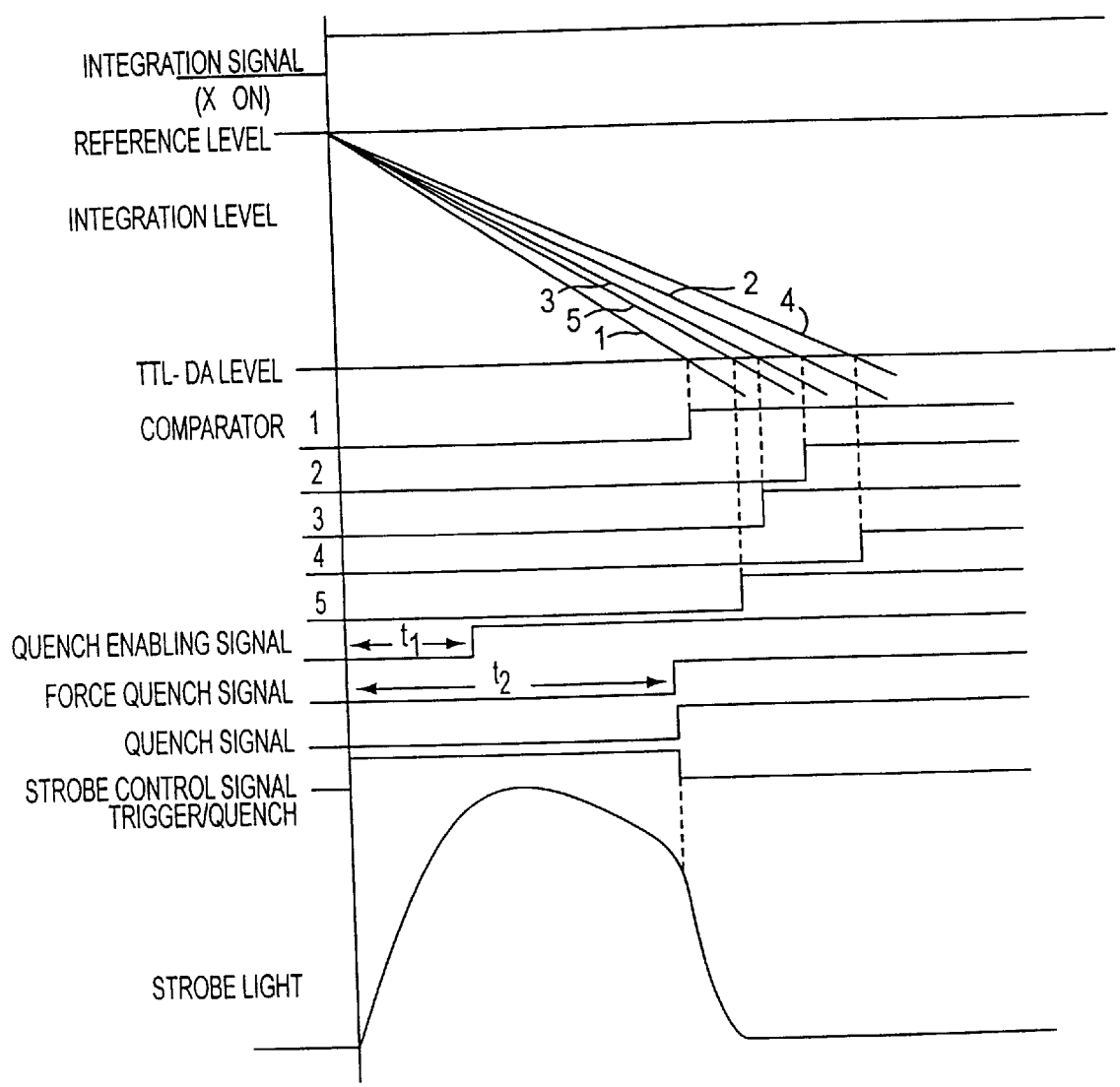
FIG. 22 is a timing chart illustrating sequential operation of the light control circuit shown in FIG. 19.

The operation of the flashlight-emission adjusting circuit 60 will be further explained in detail with reference to the timing charts shown in FIGS. 10 and 22. FIG. 10 shows a timing chart in the case where an emission of strobe is completed in synchronization with the firstly outputted integral calculation completion signal after the the emission time (e.g., the shortest strobe emission time) elapses. FIG. 22 shows another timing chart in the case where an emission of strobe is completed in synchronization with the compulsion quench signal outputted at the time the longest strobe emission time elapses.

It should be noted that the shortest strobe emission time in this embodiment is shorter than the optimum strobe emission time or the time which is shorter than the optimum strobe emission time by a predetermined time. This predetermined time corresponds to an exposure value Ev of about 0.5 through 1.0.

Furthermore, it should be noted that the longest strobe emission time in this embodiment is longer than the optimum strobe emission time. This predetermined time corresponds to an exposure value Ev of about 0.5 to 1.0.

The longest strobe emission time is, for instance, slightly longer than the emission time (i.e., emission continuation time) of the built-in strobe 19 when the built-in strobe 19 flashes in its fully charged state.

The shortest strobe emission time (i.e., first limit) is herein the emission time calculated through the above-noted calculation, i.e., the time (i.e., counted value) from the time the emission signal is outputted to the time the quench permission signal is generated.

The longest strobe emission time (i.e., second limit) is herein the emission time (i.e., counted value) from the time the emission signal is outputted to the time the compulsion quench signal is generated.

The output of the NOR circuit 66 normally stays at the "L" level. In this state, when the emission signal is outputted, the output of the NOR circuit 66 turns out to be an emission signal of an "H" level (i.e., trigger signal), thereby the strobe circuits 18, 32 actuate the built-in strobe 19 and the external strobe 33 to flash, respectively.

In the case where the quench permission signal has not been outputted, the output of each comparator 621, 622, 623, 624, 625 is ignored to maintain the emission. Therefore, the emission of strobe can be adequately controlled by means of defining the time for maintaining the emission of strobe through calculation and by controlling the emission of strobe in accordance with the calculated time, which will be explained later in detail.

When the integral calculation commencing signal is outputted at the same time the emission signal is outputted, all the integral calculation commencing switches SWRES are closed to actuate all the integrating circuits 521, 522, 523, 524, 525 to each start an integral calculation. Thereafter, it is assumed that the resulting output voltage of each integral circuit reaches an integral completion voltage in the following order: second integrating circuit 522, fourth integrating circuit 524, first integrating circuit 521, fifth integrating circuit 525 and third integrating circuit 523. Namely, it is assumed that the resulting output voltage of each integrating circuit reaches the TTL–DA level at second comparator 622, fourth comparator 624, first comparator 621, fifth comparator 625 and third comparator 623, in this order.

Figure 10:
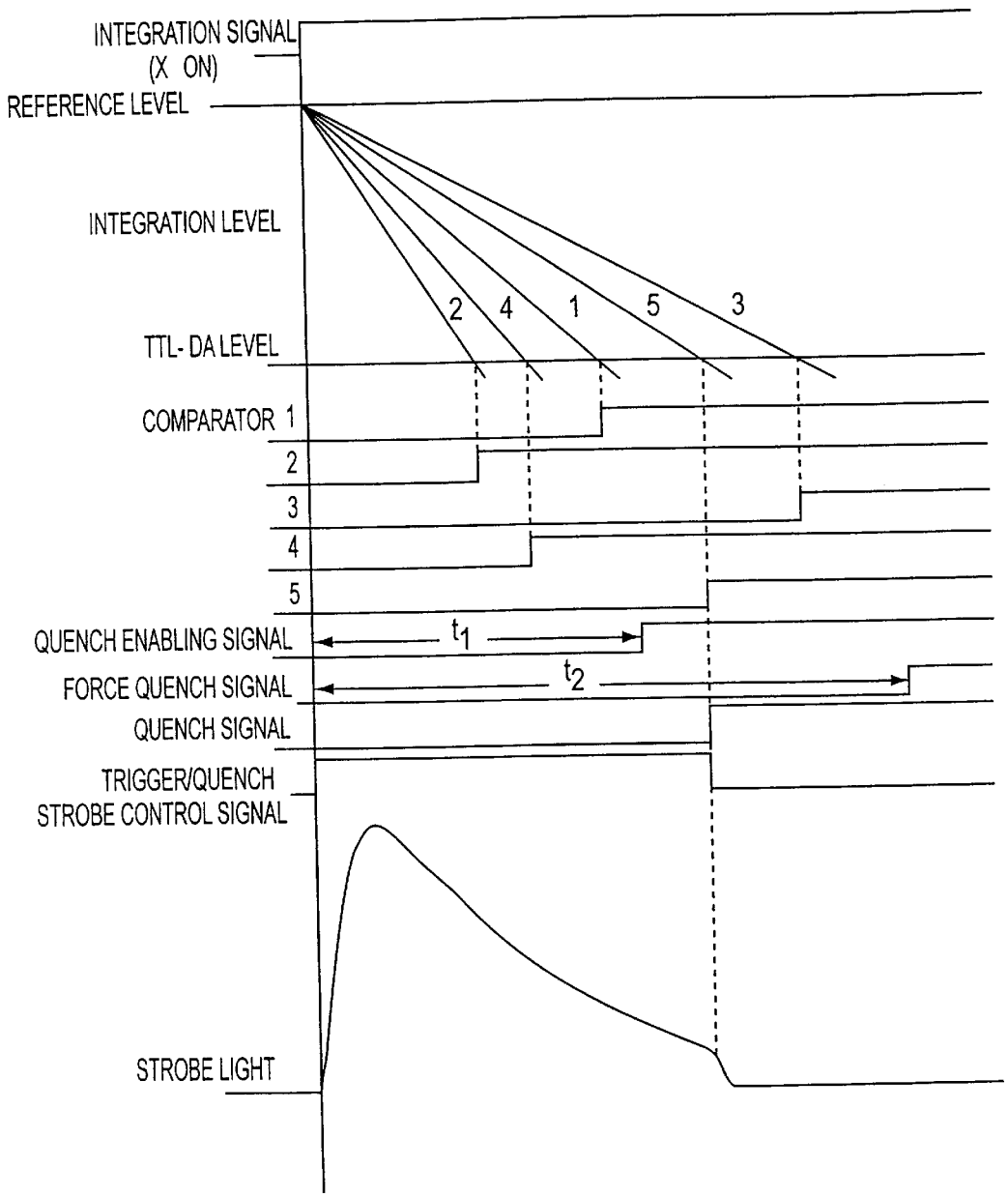
FIG. 10 is a timing chart illustrating a sequential operation of the second embodiment.
Figure 11:
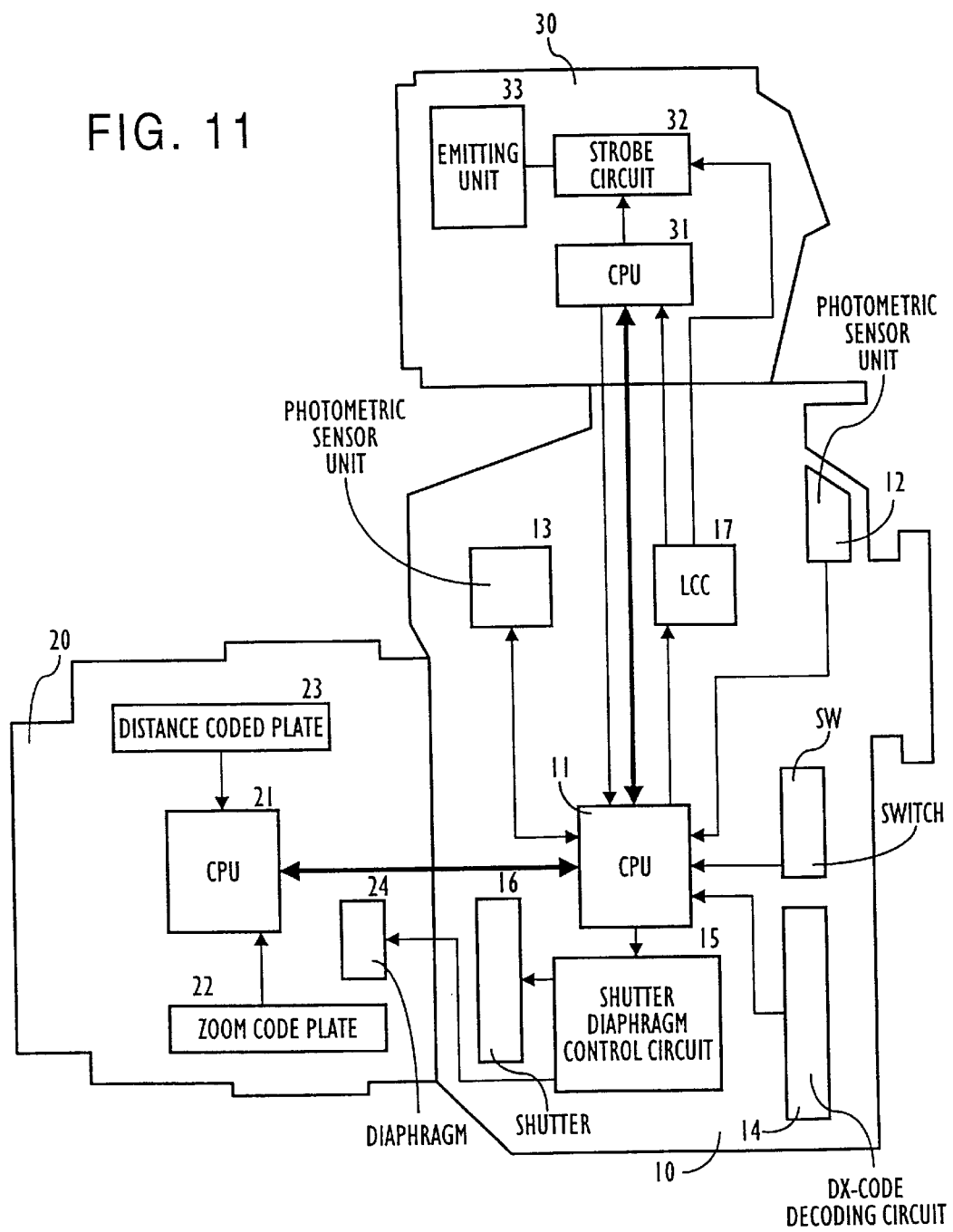
FIG. 11 is a block diagram illustrating some of the important components of a control system used in a third and fourth embodiments of a single lens reflex camera having a flashlight control apparatus, according to the first aspect of the present invention.

In FIG. 10, the quench enabling signal is outputted after the second, fourth and first comparators 622, 624, 621 each output the integral calculation completion signal. Therefore, even if the second, fourth and first comparators 622, 624, 621 each output the integral calculation completion signal, the enabling signal remains at the "H" level until the quench permission signal is outputted, thereby the strobe emission continues. This quench enabling signal is a signal for restricting the shortest strobe emission time.

After the quench enabling signal is outputted, the NOR circuit 66 outputs the strobe control signal (i.e., quench signal) in synchronization with the firstly outputted integral calculation completion signal (i.e., the integral calculation completion signal outputted from the fifth comparator 625 in the assumption herein). The strobe circuits 18, 32 each stop flashlight emission on receiving the outputted strobe control signal.

On the other hand, in FIG. 22, the resulting output voltage firstly outputted from the first integrating circuit 521 reaches the TTL–DA level after the compulsion quench signal is outputted. In this case, the strobe control signal drops to the "L" level in synchronization with the compulsion quench signal to thereby stop the strobe emission. This type of timing chart is due to situations such that the reflection ratio is quite low at all the photometering areas and that a subject to be photographed is located distant from the camera.

Figure 23:
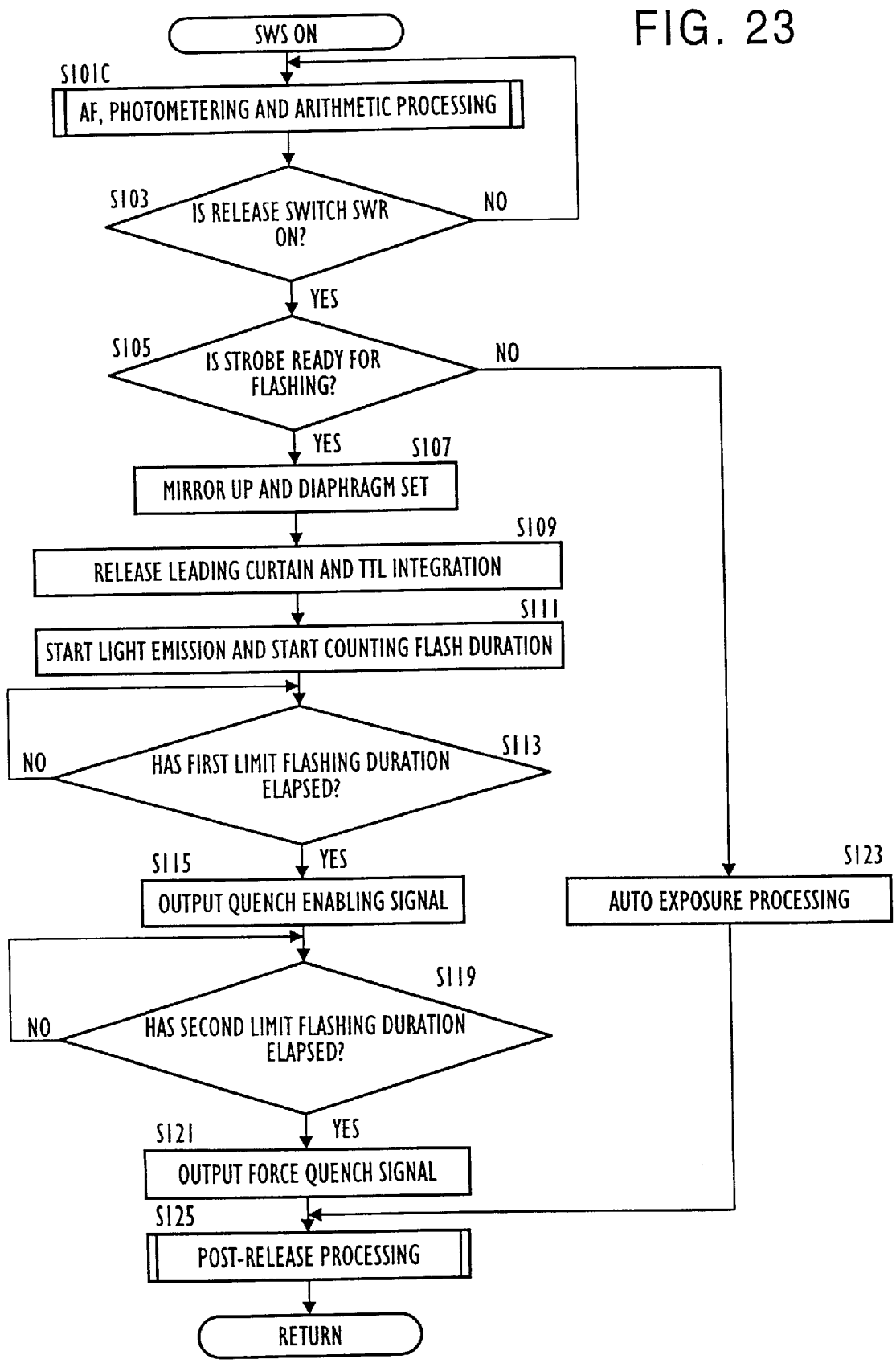
FIG. 23 is a flow chart illustrating a sequential operation for strobe light emission of the single lens reflex camera shown in FIG. 18.

FIG. 23 shows a flow chart regarding the strobe emission control in the second aspect of the present invention. This flow chart is similar to that shown in FIG. 6 except that this flow chart does not have a step corresponding to S117 in FIG. 6 and that S101C of this flow chart (i.e., AF/photometering/calculation subroutine) is different from the operation of S101 in FIG. 6. The main CPU 11 inputs the aperture value information and object distance information by communicating with the lens CPU 21 and also inputs the guide number data of the external strobe 300 by communicating with the strobe CPU 31 before the main CPU begins the process shown in the flow chart of FIG. 23.

Figure 24:
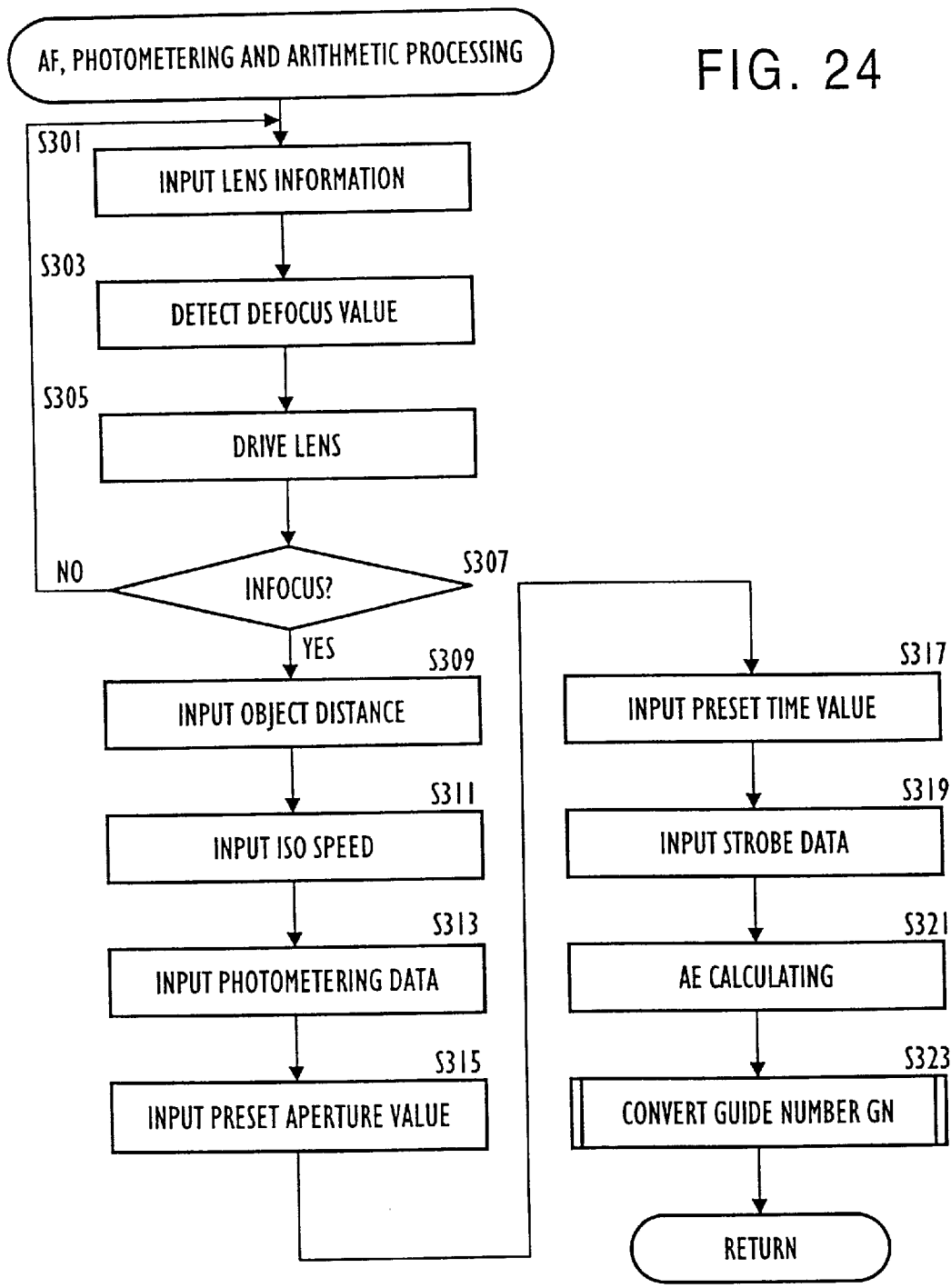
FIG. 24 is a subroutine of the flow chart shown in FIG. 23, showing photometric and arithmetic processing.

FIG. 24 shows the AF/photometering/calculation subroutine of step S101C. In this subroutine, the various data necessary for AF operation, AE operation and strobe emission operation are inputted from the zoom lens 200 and the external strobe 300 so as to determine an object distance and a subject brightness, the film ISO speed data is inputted to calculate an optimum shutter speed, an aperture value and an optimum strobe emission time of each of the built-in and external strobes 19, 30.

Firstly, the maximum aperture value, minimum aperture value, focal length data and object distance data as lens data are inputted from the lens CPU 21 (step S301). Thereafter, the defocus information is inputted from the AF sensor 47 to calculate a defocus amount and a shifting amount of the focusing lens (step S303). After this calculation the focusing lens is driven to move by the calculated shifting amount (step S305). The above steps (i.e., steps S301 to S305) are repeated until an in-focus condition is obtained (steps S301 to S307).

When an in-focus condition is obtained, the object distance data is inputted from the zoom lens 200, the film ISO speed data is inputted, and subsequently, the subject brightness information is inputted through the AE photometering sensor unit 12, the preset aperture value and shutter speed (steps S309, S311, S313, S315, S317).

Thereafter, the strobe information (i.e., guide number GN0) of the external strobe 300 is inputted from the strobe CPU 31, and at the same time, the strobe information and predetermined data including factors and fixed numbers of the built-in strobe 19 is inputted from the ROM in the strobe CPU 31 (step S319).

Thereafter, at step S321, the shutter speed or time value Tv and aperture value Av are calculated in accordance with a selected exposure mode with the equation such as the following:

$$Ev=Bv+Sv-Xv=Tv+Av$$

wherein "Ev" represents the exposure value;
"Bv" represents the brightness value;
"Sv" represents the speed value;
"Xv" represents the exposure value compensation value;
"Tv" represents the time value; and
"Av" represents the aperture value.

Thereafter, at step 323, the emission amount (i.e., guide number GN) is calculated from the formerly inputted object distance data (meters) and the f-number converted from the formerly calculated aperture value Av with the following equation:

$$GN = \text{"object distance"} \times \text{"f-number"} \qquad (1)$$

This equation may be represented by the following equation according to APEX system:

Gv=Dv+Av wherein "Gv" is equal to $2\log_2$ (GN);

"Dv" is equal to $2\log_2$ (object distance); and

"Av" is equal to $2\log_2$ (f-number).

The guide number GN is converted into emission time data through the strobe information-to-emission time data converting operation, and subsequently, control is returned. This obtained emission time is used as the counter value at step S111.

The sub-routine of the strobe information-to-emission time data converting operation of step 323 in FIG. 24 will be explained in detail with reference to FIGS. 25 to 32.

Figure 25:
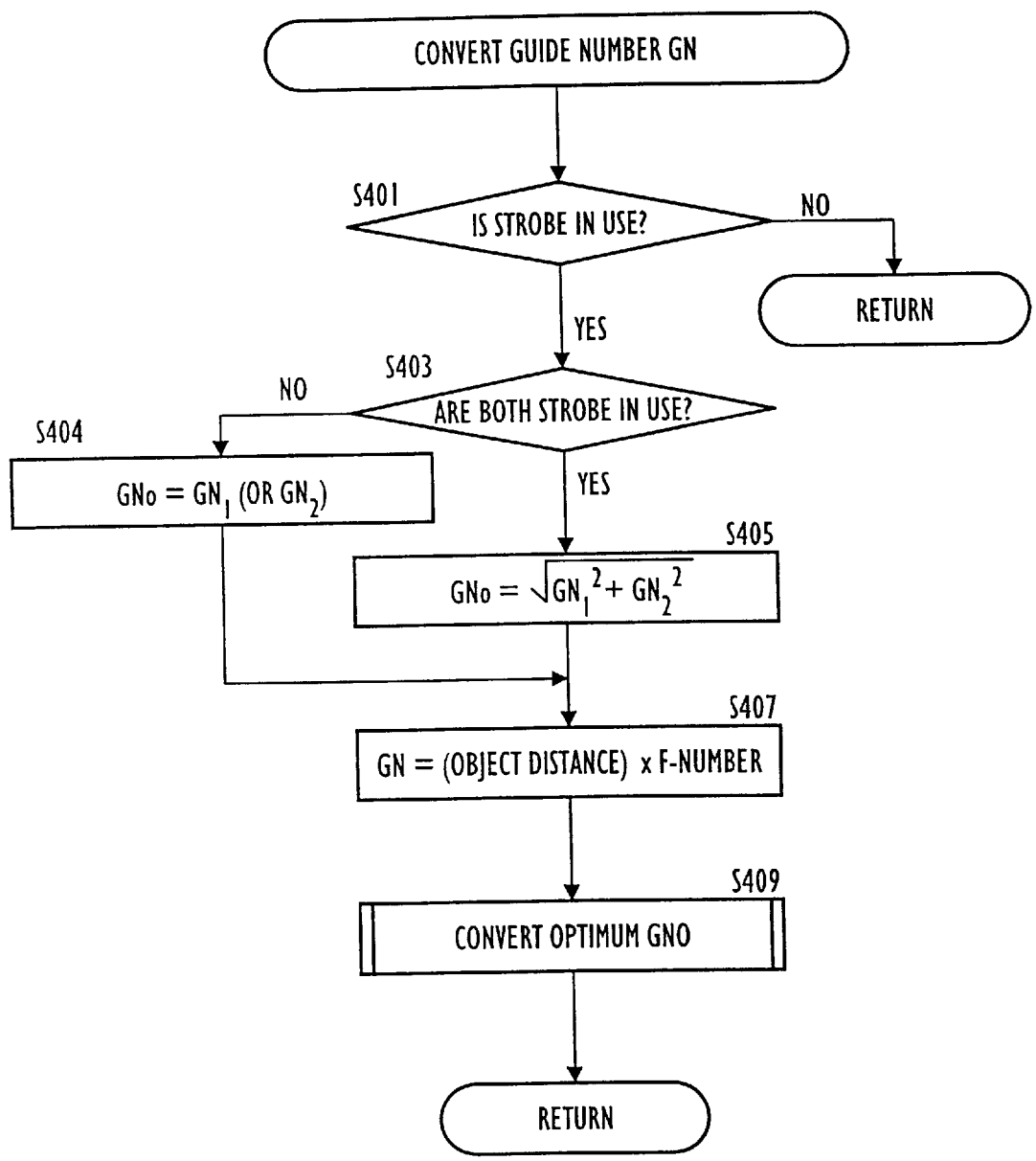
FIG. 25 is a flow chart illustrating a first embodiment of a strobe information—time data conversion, of the single lens reflex camera shown in FIG. 18.

FIGS. 25 and 27 show the first embodiment of the subroutine of strobe information-to-emission time data converting operation in which the emission time is calculated through a guide number-to-emission time conversion table (i.e., GN0—t table) by means of calculating a composite guide number GN0 of the built-in and external strobes 19 and 300.

In the subroutine of the first embodiment, firstly, at step S401, control is returned when both strobes 19 and 300 are not in use, or control proceeds to step S403 when at least one of the strobe is in use. At step S403, it is checked if both strobes are in use, i.e., it is checked if more than one guide number GN has been inputted. In the case when more than one guide number GN has been inputted, control proceeds to step S405 to calculate the composite guide number GN0 according to the following equation:

$$GN0 = (GN1^2 + GN2^2)^{1/2} \qquad (2)$$

wherein "GN1" represents the guide number of the first strobe (i.e., built-in strobe 19), and "GN2" represents the guide number of the second strobe (i.e., external strobe 300).

In the case when only guide number GN has been inputted, control proceeds to step S404 to calculate the guide number GN0 according to the following equation:

GN0=GN1 or GN0=GN2

After, step S404 or S405, at step S407, an optimum guide number GN is calculated from the formerly inputted object distance data (meters) and the f-number converted from the formerly calculated aperture value Av with the following equation:

$$GN = \text{"object distance"} \times \text{"f-number"} \qquad (1)$$

This equation may be represented by the following equation according to APEX system:

Gv=Dv+Av wherein "Gv" is equal to $2\log_2$ (GN);

"Dv" is equal to $2\log_2$ (object distance); and

"Av" is equal to $2\log_2$ (f-number).

Figure 26:
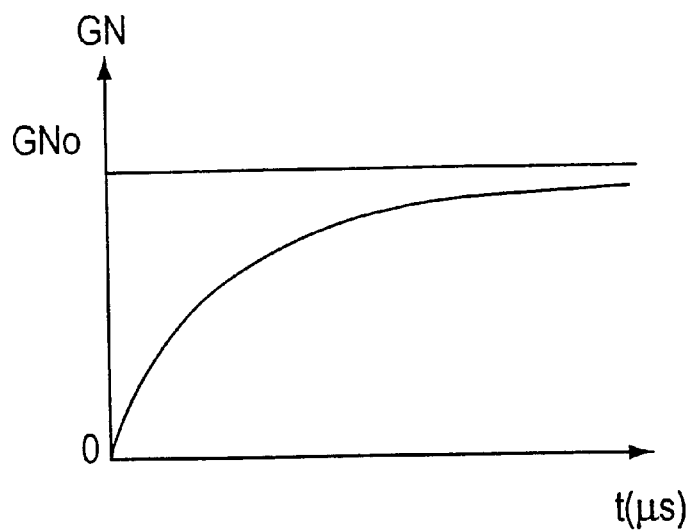
FIG. 26 is a graph showing a relationship between a composite guide number and the duration of light emission for the first embodiment shown in FIG. 25.

Thereafter, at step S409, the emission time "t" with which the optimum guide number GN is obtained is selected from one of the composite guide number-to-emission time conversion tables (i.e., GN0—t Tables (A), (B) and (C); see FIG. 27). The graph shown in FIG. 26 shows the relation between the composite guide number GN0 and the emission time "t". In the graph, the vertical coordinate and the horizontal coordinate correspond to the composite guide number GN0 and the emission time "t", respectively.

In FIG. 27, Table (A) shows the relation between the optimum guide number GN and the emission time "t" when the composite guide number GN0 is 14. Table (B) shows the relation between the optimum guide number GN and the emission time "t" when the composite guide number GN0 is 20. Table (C) shows the relation between the optimum guide number GN and the emission time "t" when the composite guide number GN0 is 24. The numerical data in these Tables have been actually measured in advance and stored in a ROM (not shown) provided in the camera body 100. Although there are only three Tables (A), (B) and (C) shown in FIG. 27, two or more than three different Tables may be provided. Furthermore, the concrete numerical data in each Table may be different from those in Tables (A), (B) and (C). Moreover, although the optimum guide number increases one by one in each Table (A), (B), (C), i.e., 1, 2, 3, 4, . . . , the optimum guide number may increase with a different step.

Figure 28:
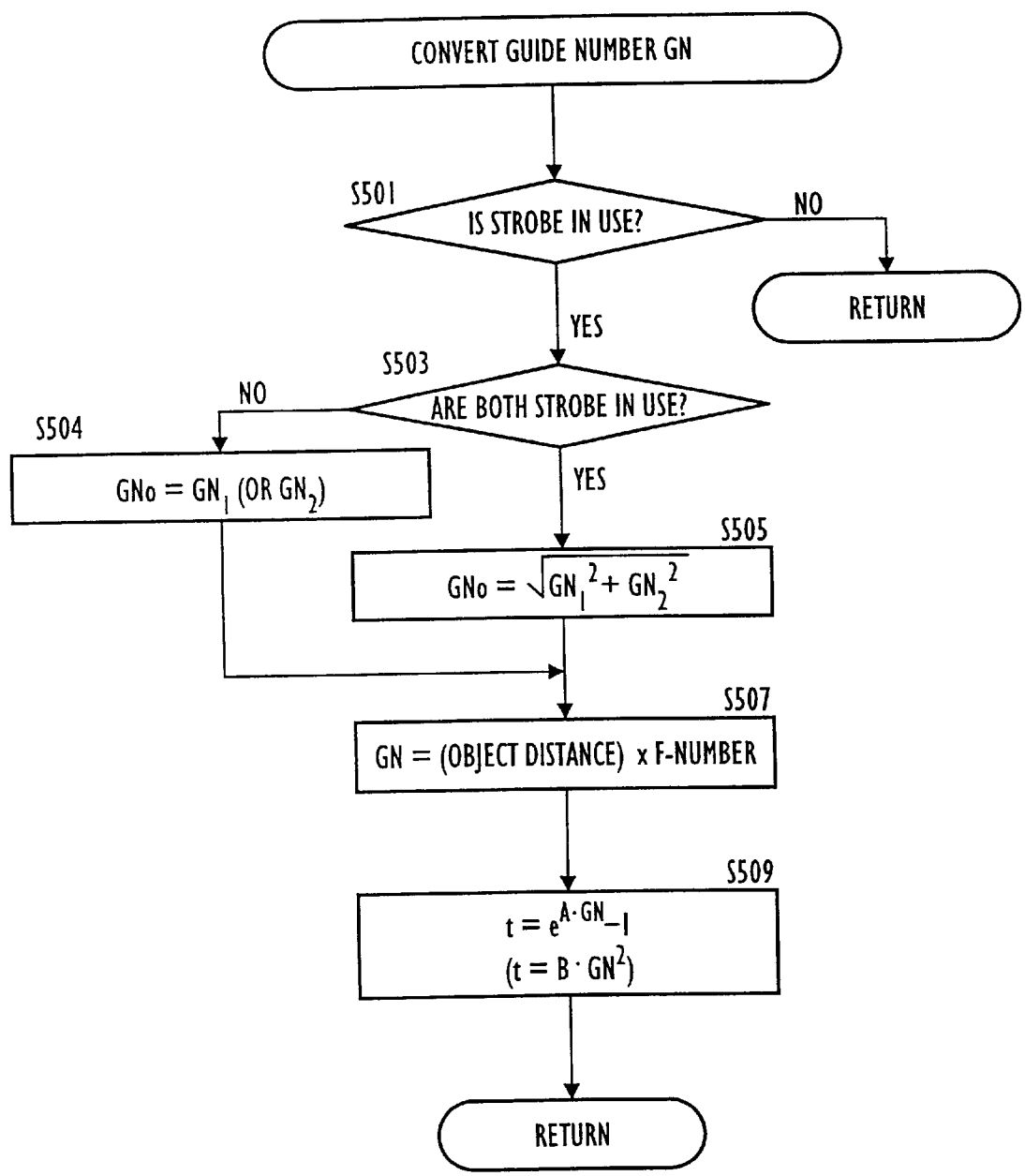
FIG. 28 is a flow chart illustrating a second embodiment of a strobe information—time data conversion, of the single reflex camera shown in FIG. 18.

FIG. 28 shows the second embodiment of the subroutine of strobe information-to-emission time data converting operation in which the emission time "t" corresponding to the composite guide number GN0 is calculated through a predetermined equation. Steps S501 through S507 of this subroutine are identical to steps S401 through S407 in FIG. 25. For this reason, explanations about steps S401 through S407 are omitted.

At step S509, the emission time "t" is calculated in accordance with the following equation:

$$t = e^{A \cdot GN} - 1 \qquad (3)$$

wherein "e" represents the base of natural logarithm;

"$_{GN}$" represents the optimum guide number; and

Figure 29:
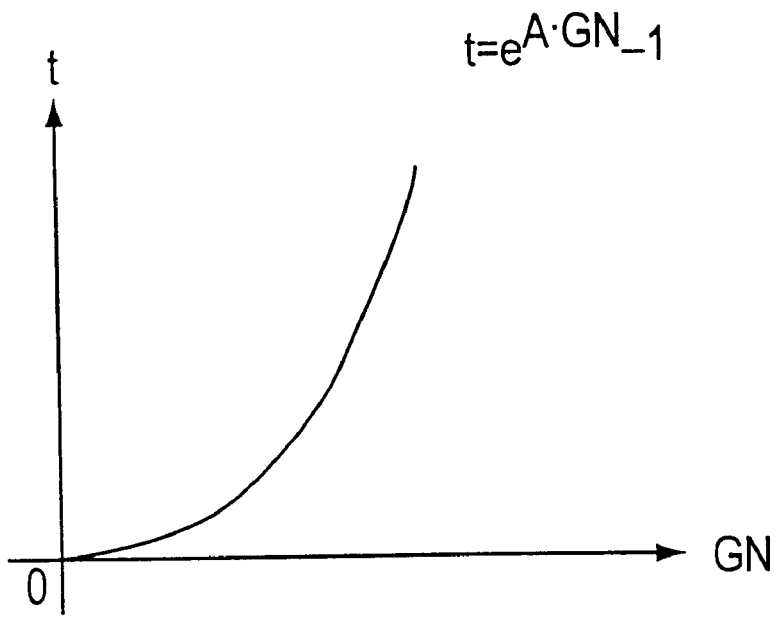
FIGS. 29A and 29B are graphs showing a relationship between a composite guide number and the duration of light emission for the second embodiment shown in FIG. 28.
Figure 29:
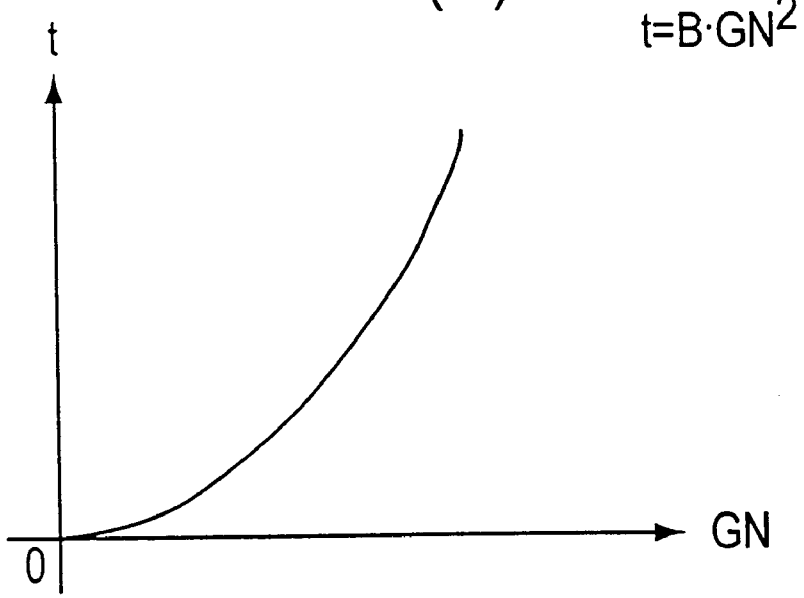

"$_A$" represents the fixed number determined in accordance with the composite guide number/emission time curve of strobe, defined according to the composite guide number GN0, of the graph (A) shown in FIG. 29.

When "$_A$" is equal to "30×10-6" with the composite guide number GN0 being 14, the emission time "t" is approximately 300 μs (t≠300 μs) in the case where the optimum guide number is 10. In the graph (A) of FIG. 29, the vertical coordinate and the horizontal coordinate correspond to the emission time "t" and the optimum guide number GN, respectively.

At step 509, instead of the above equation (3), the emission time "t" may be calculated in accordance with the following another equation:

$$t = B \times GN^2 \qquad (4)$$

wherein "B" represents the fixed number determined in accordance with the composite guide number GN0.

In this case, for instance, when it is assumed that "B" is equal to "5×10-6" with the composite guide number GN0 being 14, the emission time "t" is approximately 180 μs (t≠180 μs) in the case where the optimum guide number is 6. In the graph (B) of FIG. 29, the vertical coordinate and the horizontal coordinate correspond to the emission time "t" and the optimum guide number GN, respectively.

Figure 30:
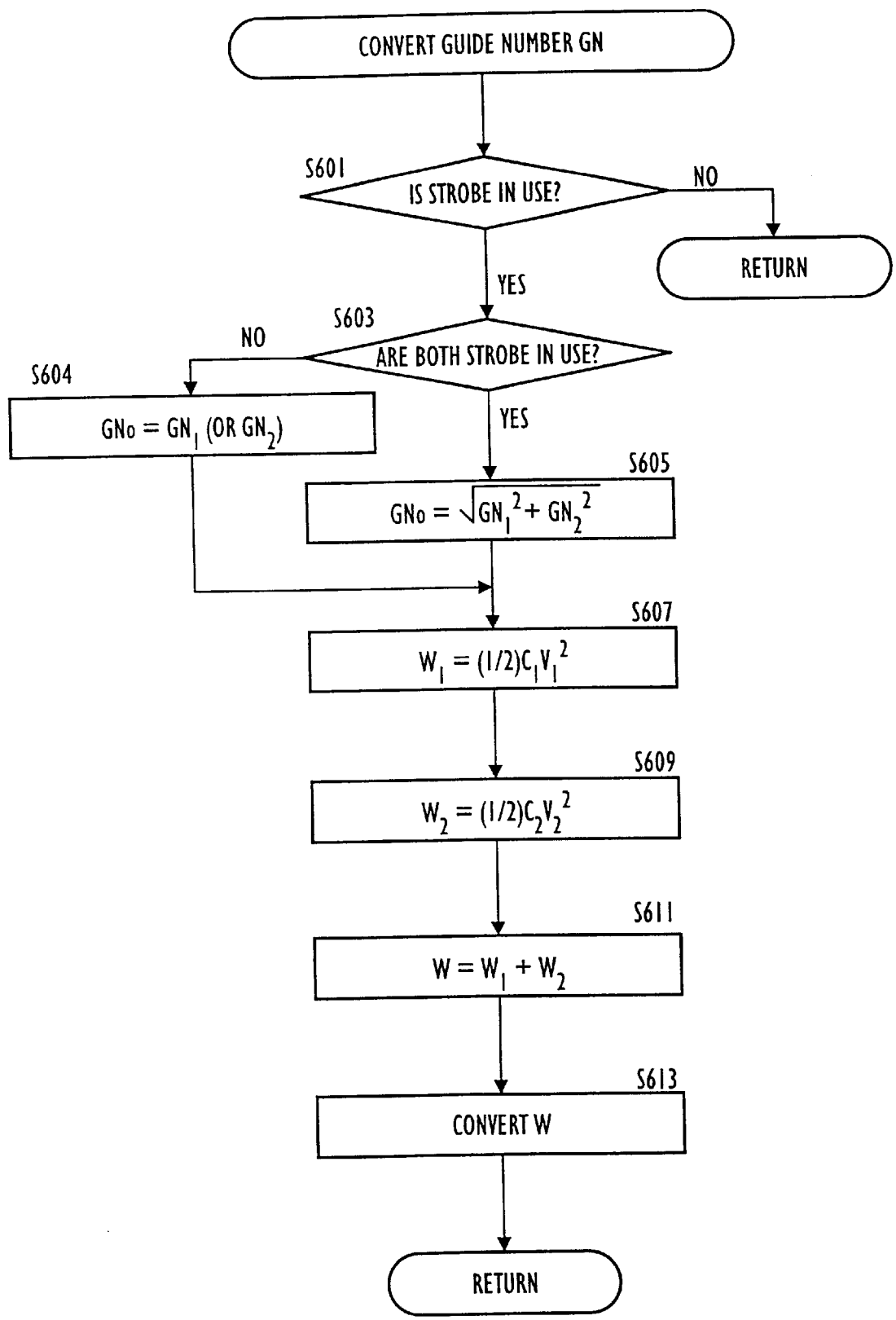
FIG. 30 is a flow chart illustrating a third embodiment of a strobe information—time data conversion, in the single lens reflex camera shown in FIG. 18.

FIG. 30 shows the third embodiment of the subroutine of strobe information-to-emission time data converting operation in which the emission time "t" is determined in accordance with the capacity "C" of the main condenser of the strobe, the charging voltage "V" (i.e., terminal voltage of the main condenser), the electrostatic energy amount "W" and the like.

In this third embodiment, firstly, the electric capacity $C_1$ of the main condenser CM provided in the strobe circuits 18; the electric capacity $C_2$ of the main condenser CM provided in the strobe circuits 32; the charging voltage $V_1$ of the main condenser CM in the strobe circuits 18; and the charging voltage $V_2$ of the main condenser CM in the strobe circuits 32 are detected to calculate the total electrostatic energy amount "W" (J: joule) in accordance with the following equation:

$$W=[(½) \times C_1 \times V_1^2]+[(½) \times C_2 \times V_2^2] \qquad (5)$$

Figure 31:
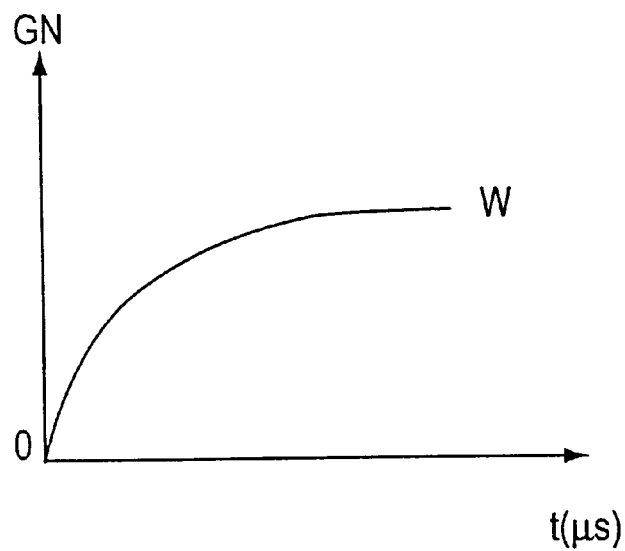
FIG. 31 is a graph showing a relationship between a composite guide number and the duration of light emission for the third embodiment shown in FIG. 30.

Subsequently, the optimum emission time "t" is determined according to the relation between the total electrostatic energy amount "W" and the guide number-emission time relationship. FIG. 31 shows this relation.

Steps S605 through S605 of this subroutine shown in FIG. 30 are identical to steps S401 through S405 in FIG. 25. For this reason, explanations about steps S601 through 605 are omitted.

At step S607, the electrostatic energy amount $W_1$ of the built-in strobe circuit 18 is calculated according to the electric capacity $C_1$ of the main condenser CM of the built-in strobe circuit 18 and the charging voltage $V_1$ of the main condenser CM in the strobe circuits 18. Likewise, at step S609, the electrostatic energy amount $W_2$ of the external strobe circuit 32 is calculated according to the electric capacity $C_2$ of the main condenser CM of the external strobe circuit 32 and the charging voltage $V_2$ of the main condenser CM in the external strobe circuits 32. Thereafter, at step S611, the above calculated electrostatic energy amounts $W_1$ and $W_2$ are added to obtain the total electrostatic energy amount W.

After the total electrostatic energy amount W is obtained, the emission time "t" corresponding to the optimum guide number GN is selected from one of the guide number-to-emission time conversion tables (GN-t Tables (A) and (B); see in FIG. 32) which corresponds to the total electrostatic energy amount W.

In FIG. 32, Table (A) shows the relation between the optimum guide number GN and the emission time "t" when the total electrostatic energy amount W is 13. Table (B) shows the relation between the optimum guide number GN and the emission time "t" when the total electrostatic energy amount W is 30. The numerical data in these Tables have been actually measured in advance and stored in a ROM (not shown) provided in the camera body 100. Although there are only two Tables (A) and (B) shown in FIG. 32, more than two different Tables may be provided. Furthermore, the concrete numerical data in each Table may be different from those in Tables (A) and (B). Moreover, although the optimum guide number increases one by one in each Table (A) and (B), i.e., 1, 2, 3, 4, . . . , the optimum guide number may increase with a different step.

Figure 33:
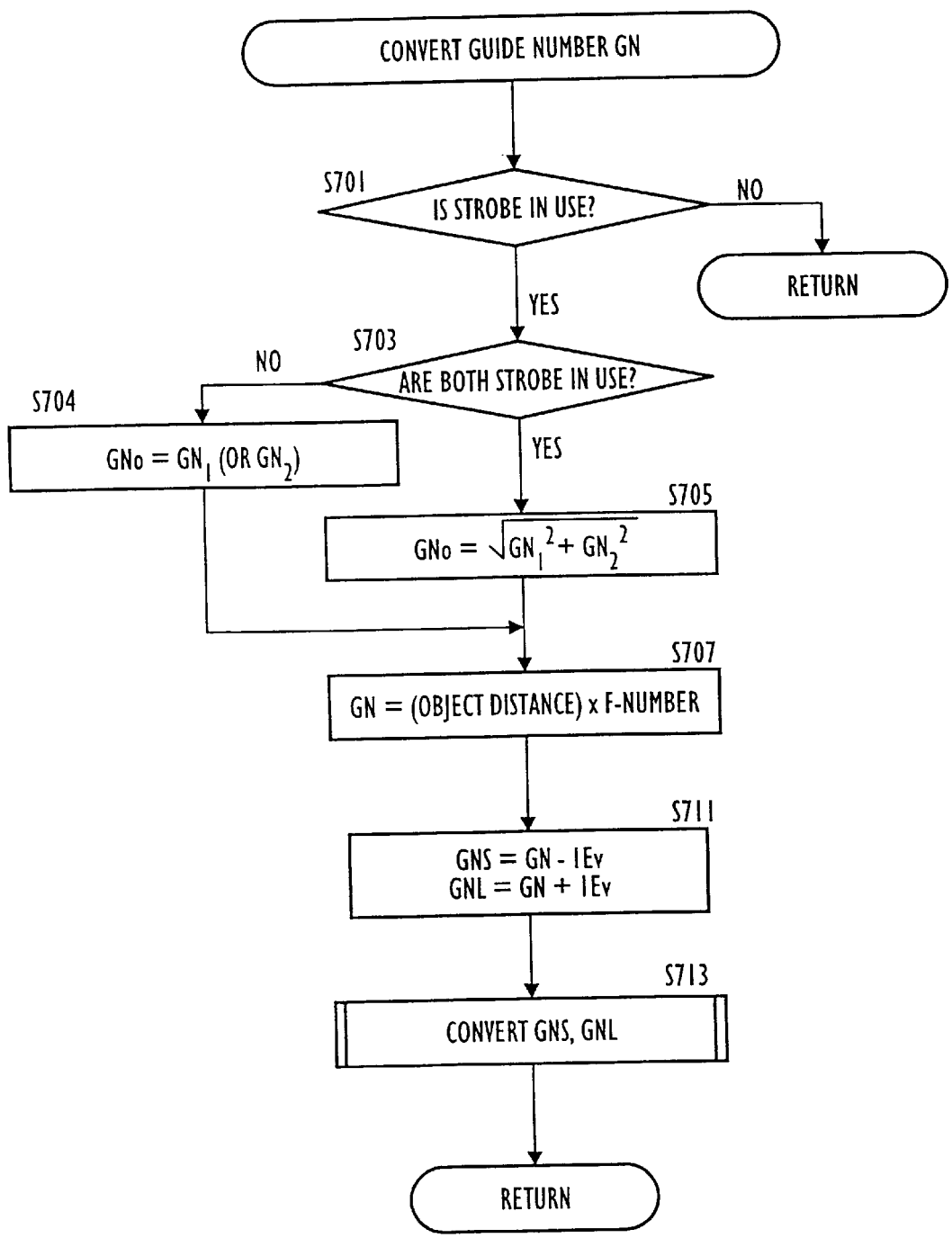

FIG. 33 shows the fourth embodiment of the present invention. Although the optimum guide number and the optimum emission time are calculated in the first embodiment shown in FIG. 25, in the fourth embodiment not only the optimum guide number and the optimum emission time are calculated, but also the first and second limit times used at Steps 113, 119, respectively, are further calculated, which is the main feature of the fourth embodiment of the present invention. Steps S701 through S707 of this subroutine are identical to steps S401 through S407 in FIG. 25. For this reason, explanations about steps S701 through S707 are omitted.

At Step 711, two guide number values GNS, GNL are calculated in accordance with the following formulas: GNS= GN−1Ev GNL=GN+1Ev wherein "GN" represents the guide number obtained at Step 707.

Thereafter, at Step 713, the obtained guide number values GNS, GNL are converted into respective strobe emission times in accordance with the strobe information-to-emission time data conversion processing. Thereafter, control is returned. For instance, in the case where the composite guide number GN0 and the optimum guide number GN are 14 and 5 (see FIG. 27 (A)), respectively., the guide number values GNS, GNL are 4 and 6, respectively (i.e., GNS=5−1, GNL=5+1). Consequently, according to the data table (A) shown in FIG. 27, the guide number value GNS "4" is converted into a corresponding count value of 70 $\mu$sec as the first limit time, while the guide number value GNL "6" is converted into a corresponding count value of 140 $\mu$sec as the second limit time.

As can be seen from the foregoing, according to the second aspect of the present invention, since the optimum strobe emission amount is obtained in accordance with the object distance information and the aperture value information, and further since the emission of strobe is controlled in accordance with the emission time based on the corresponding composite guide number, the influence due to the case where the subject brightness varies at different photometering areas is reduced.

The above embodiments to which the second aspect of the present invention is applied are all directed to a camera having one built-in strobe and one external strobe used in combination with the one built-in strobe. However, it will be appreciated that the second aspect of the present invention is applicable to a camera having one built-in strobe and more than one external strobe used in combination with the one built-in strobe. Furthermore, it will be appreciated that the second aspect of the present invention is applicable to a camera having no built-in strobe and one or more than one external strobe.

We claim:

1. A flashlight control apparatus for controlling a plurality of strobes to each emit flashlight towards a subject at the same time, wherein said flashlight control apparatus comprises:

means for receiving light reflected on said subject and for generating an output corresponding to said received light;

means for inputting an object distance information;

means for inputting a film speed information;

means for inputting a guide number information from each of said plurality of strobes;

exposure calculation means for calculating a subject brightness according to said output generated by said light receiving means and for calculating an aperture value according to said subject brightness and said film speed information;

integrating means which includes a plurality of light receiving elements and integrates an output generated by each of said plurality of light receiving elements;

flashlight quantity setting means for setting an optimum quantity of flashlight emitted by said plurality of strobes as an optimum integration level of said light receiving means;

flashlight emitting time calculation means for calculating an optimum guide number information according to said object distance information and said aperture value calculated by said exposure calculation means; a composite guide number information according to said guide number information; and an emitting time during which each of said plurality of strobes continue to emit flashlight according to said optimum guide number information and said composite guide number information; and flashlight emission controlling means for controlling all of said plurality of strobes to stop emitting flashlight, in the case where all integrated outputs generated by said plurality of light receiving elements and integrated by said integrating means have each reached said optimum integration level before said emitting time elapses.

2. The flashlight control apparatus of claim 1, wherein said flashlight emission controlling means controls said plurality of strobes to all stop emitting flashlight at the time one of said integrated outputs has reached said optimum integration level before said emitting time elapses, in the case where none of said integrated outputs has yet reached said optimum integral value when said emitting time elapses.

3. The flashlight control apparatus of claim 1, wherein said integrating means comprises a plurality of integrating means corresponding to said plurality of light receiving elements.

4. The flashlight control apparatus of claim 1, further comprising a plurality of comparators corresponding to said plurality of integrating means for each comparing corresponding one of said all integrated outputs with said optimum integration level so as to detect either a condition that said corresponding one reaches said optimum integration level or a condition that said corresponding one exceeds said optimum integration level.

5. The flashlight control apparatus of claim 1, wherein said flashlight emitting time calculation means calculates a composite quantity of flashlight of said plurality of strobes according to the following equation:

$$t = e^{AGN} - 1$$

wherein "t" represents an emission time of said plurality of strobe;

"e" represents a base of natural logarithm;

"$GN$" represents said optimum guide number; and

"$A$" represents a fixed number determined in accordance with a composite guide number GN0 of said plurality of strobes.

6. The flashlight control apparatus of claim 1, wherein said flashlight emitting time calculation means calculates a composite quantity of flashlight of said plurality of strobes according to the following equation:

$$t = B \times GN^2$$

wherein "t" represents an emission time of said plurality of strobe;

"B" represents the fixed number determined in accordance with a composite guide number GN0 of said plurality of strobes; and "GN" represents said optimum guide number.

7. The flashlight control apparatus of claim 1, further comprising a plurality of capacitors for respective said plurality of strobes, wherein said flashlight emitting time calculation means calculates a composite quantity of light of said plurality of strobes in accordance with a total accumulated amount of electricity of said plurality of capacitors.

8. The flashlight control apparatus of claim 1, further comprising a plurality of capacitors for said plurality of strobes, wherein said flashlight emitting time calculation means calculates a composite quantity of light of said plurality of strobes in accordance with a total capacity of said plurality of capacitors and a total voltage of said plurality of capacitors.

9. The flashlight control apparatus of claim 1, wherein said flashlight emission controlling means outputs an emission control signal for actuating each of said plurality of strobes to start emitting flashlight, and wherein said flashlight emission controlling means further outputs a compulsion quench signal for controlling all of said plurality of strobes to compulsively stop emitting flashlight at the time a predetermined time elapses, after said emission time has elapsed.

* * * * *